(12) United States Patent
Takshi et al.

(10) Patent No.: US 12,546,743 B2
(45) Date of Patent: Feb. 10, 2026

(54) ELECTROCHEMICAL SENSOR AND RELATED METHODS

(71) Applicant: UNIVERSITY OF SOUTH FLORIDA, Tampa, FL (US)

(72) Inventors: Arash Takshi, Tampa, FL (US); Mohammad Shakhawat Hossain, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 318 days.

(21) Appl. No.: 18/186,877

(22) Filed: Mar. 20, 2023

(65) Prior Publication Data

US 2023/0296554 A1    Sep. 21, 2023

Related U.S. Application Data

(60) Provisional application No. 63/269,583, filed on Mar. 18, 2022.

(51) Int. Cl.
| | |
|---|---|
| *G01N 27/413* | (2006.01) |
| *G01N 27/30* | (2006.01) |
| *G01N 27/404* | (2006.01) |
| *G01N 33/00* | (2006.01) |
| *G01N 27/327* | (2006.01) |

(52) U.S. Cl.
CPC ......... *G01N 27/413* (2013.01); *G01N 27/308* (2013.01); *G01N 27/4045* (2013.01); *G01N 33/0047* (2013.01); *G01N 27/327* (2013.01)

(58) Field of Classification Search
CPC ............... G01N 27/413; G01N 27/308; G01N 27/327–3272; G01N 27/4145; G01N 27/4045; G01N 27/021; G01N 27/026; G01N 33/0047; G01N 33/0057
See application file for complete search history.

(56) References Cited

U.S. PATENT DOCUMENTS

| | | | |
|---|---|---|---|
| 8,152,992 B2 * | 4/2012 | Smela ................ | G01N 33/5044 205/792 |
| 11,035,817 B1 * | 6/2021 | Eissa ................ | G01N 33/56983 |

OTHER PUBLICATIONS

Gualtieri, Alessandro F. "Recycling asbestos-containing material (ACM) from construction and demolition waste (CDW)." Handbook of recycled concrete and demolition waste. Woodhead Publishing, 2013. 500-525.

Hileman, A. R. "Weather and its effect on air insulation specifications." IEEE transactions on power apparatus and systems 10 (1984): 3104-3116.

Byrne, G. T., R. P. Linstead, and A. R. Lowe. "Phthalocyanines. Part I. a new type of synthetic colouring matters." J. Chem. Soc (1934): 1016-1017.

(Continued)

*Primary Examiner* — Alexander S Noguerola
(74) *Attorney, Agent, or Firm* — HUSCH BLACKWELL LLP

(57) ABSTRACT

Sensors and related methods for detecting chemicals, gases and molecules using a plurality of electrodes, a liquid mucus based electrolyte and a separator to hold the liquid electrolyte and wet the surface of the first electrode and wet the surface of the second electrode with the liquid electrolyte. One or more electrodes may include a metallophthalocyanine or a metalloporphyrin or a derivative thereof or an electrode may be in electrical contact with a metallophthalocyanine or a metalloporphyrin.

20 Claims, 25 Drawing Sheets

(56) References Cited

OTHER PUBLICATIONS

Figure 1:
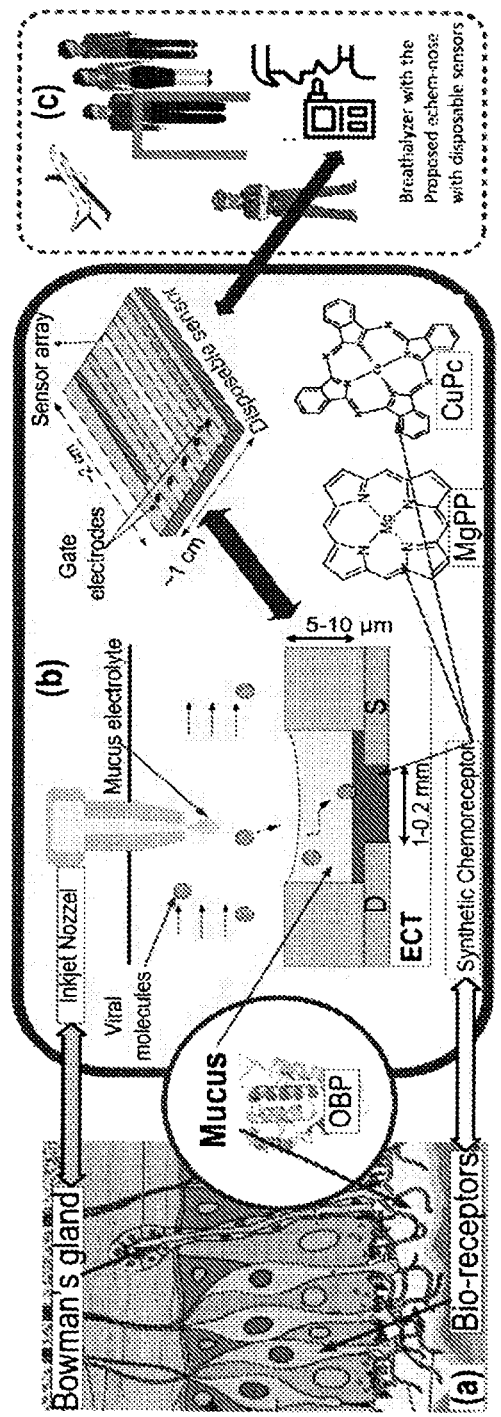

Sizun, Thibaut, Marcel Bouvet, and Jean-Moïse Suisse. "Humidity effect on ammonia sensing properties of substituted and unsubstituted cobalt phthalocyanines." Talanta 97 (2012): 318-324.

Dent, C. E., R. P. Linstead, and A. R. Lowe. "217. Phthalocyanines. Part VI. The structure of the phthalocyanines." Journal of the Chemical Society (Resumed) (1934): 1033-1039.

Park, Jun Hong, Pabitra Choudhury, and Andrew C. Kummel. "NO adsorption on copper phthalocyanine functionalized graphite." The Journal of Physical Chemistry C 118.19 (2014): 10076-10082.

Lee, Yuh-Lang, and Chi-Hsiu Chang. "NO2 sensing characteristics of copper phthalocyanine films: Effects of low temperature annealing and doping time." Sensors and Actuators B: Chemical 119.1 (2006): 174-179.

Li, Xian, et al. "Copper phthalocyanine thin film transistors for hydrogen sulfide detection." Sensors and Actuators B: Chemical 176 (2013): 1191-1196.

Kilinç, Necmettin, et al. "Electrical and NO2 sensing properties of liquid crystalline phthalocyanine thin films." Sensors and Actuators B: Chemical 173 (2012): 203-210.

Ghani, Fatemeh, Juliane Kristen, and Hans Riegler. "Solubility properties of unsubstituted metal phthalocyanines in different types of solvents." Journal of Chemical & Engineering Data 57.2 (2012): 439-449.

Hoshino, Akitaka, Yoshiko Takenaka, and Hideki Miyaji. "Redetermination of the crystal structure of α-copper phthalocyanine grown on KCl." Acta Crystallographica Section B: Structural Science 59.3 (2003): 393-403.

Heutz, S., et al. "Polymorphism in phthalocyanine thin films: Mechanism of the α→β transition." The Journal of Physical Chemistry B 104.30 (2000): 7124-7129.

Ashida, M., N. Uyeda, and E. Suito. "Thermal transformation of vacuum-condensed thin films of copper-phthalocyanine." Journal of Crystal Growth 8.1 (1971): 45-56.

Miller, Casey W., et al. "Quantitative structural analysis of organic thin films: An x-ray diffraction study." Physical Review B—Condensed Matter and Materials Physics 72.10 (2005): 104113.

Keizer, Steven P., et al. "Spectroscopy and electronic structure of electron deficient zinc phthalocyanines." Journal of the American Chemical Society 125.23 (2003): 7067-7085.

Peisert, H., et al. "Fluorination of copper phthalocyanines: Electronic structure and interface properties." Journal of applied physics 93.12 (2003): 9683-9692.

Clack, D. W., N. S. Hush, and I. S. Woolsey. "Reduction potentials of some metal phthalocyanines." Inorganica Chimica Acta 19 (1976): 129-132.

* cited by examiner

ELECTROCHEMICAL SENSOR AND RELATED METHODS

TECHNICAL FIELD

The present invention generally relates to sensors and more specifically to apparatus and related methods for chemical gas sensors.

BACKGROUND AND SUMMARY

New methods for identifying infections and disease, such as COVID-19, are needed that are accurate, sensitive, and cost effective. Scientific studies have shown that some animals (e.g., dogs) can identify human patients as having certain diseases among a group of people by scent.[1]. Specifically, diseases with respiratory symptoms have been detected by analyzing the chemicals from patients' breath samples [2, 3]. Current man made electronic-nose (e-nose) devices are commonly made using an array of metal-oxide (MOX) gas sensors [4-19]. Generally, MOX sensors have a relatively poor selectivity/accuracy to various volatile organic chemicals (VOCs). Among other things, currently available e-nose technology for analyzing human breath risks contamination of the sensors and further spread of the contagious disease, for instance when the same device is used for testing different people. Hence, disposable sensors with high accuracy and sensitivity are needed.

Figures 2A, 2B, 2C:
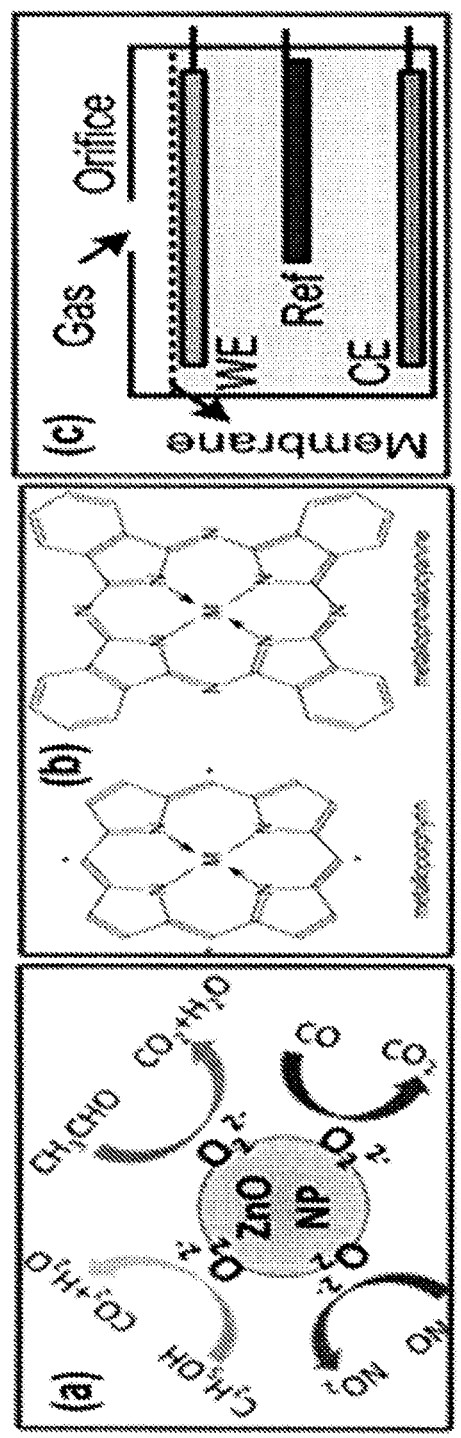

Studies in gas detection technology mainly rely on the development of gas sensors made from metal-oxide (MOX) materials. Nanostructures of MOXs such as ZnO, $WO_3$, and $SnO_2$ have been used in the form of resistors, diodes, and transistors for making sensors [19, 33, 34]. Dangling bonds at the surface of the materials allow oxygen atoms to be reactive to adsorbed chemicals which change the electrical properties of the material [19]. However, as shown in FIG. 2.a, the relatively poor selectivity is a serious shortcoming. In contrast, e-nose sensors are made of an array of sensors, each being more sensitive to a particular gas(es) or VOCs [12]. A combination of signals received from all sensors may be analyzed using a processing algorithm to identify the chemicals being detected [12]. The sensor selectivity depends on the sensitivity of each sensor and an artificial intelligence algorithm. Nevertheless, relying on different sensors, each with a limited selectivity, the output can have a high rate of false positive or negative results. Also, the cost of making an array of different MOXs is a concern for making disposable sensors.

Other types of gas sensors, such as microbalance and surface acoustic wave devices, require materials for selective adsorption of VOC and gas molecules (Table 1).

TABLE 1

Different gas sensing methods [14, 35].

| Detection device | Selectivity/ accuracy | Sensitivity | LOD | Response time | Fab. cost | Disposable |
|---|---|---|---|---|---|---|
| MOX (resistors, diodes & transistors) | x | ✓ High | ✓ (Low-ppm) | ✓ seconds | ✓ | x |
| Gas chromatography | ✓ | ✓ High | ✓ (Low-ppb) | x hours | x | x |
| Quartz-microbalance | x | ✓ High | x (Medium) | ✓ seconds | x | x |
| Surface Acoustic Wave (SAW) | x | ✓ High | x (Medium) | ✓ seconds | x | x |
| Optical | x | x Low | x (High) | x minutes | ✓ | ✓ |
| MPc/MPP gas sensors | ✓ | x Low | x (High) | x minutes | ✓ | ✓ |
| Electrochemical gas sensors* | ✓ | x Low | x (High) | x minutes | ✓ | x |
| Echem-nose | ✓ | ✓ High | ✓ (Low) ppm | ✓ seconds | ✓ scalable | ✓ |

✓ = acceptable and x = not acceptable.
ppm = part per million.
ppb = part per billion.
*Electrochemical gas sensors shown in FIG. 2.b.

Optical detection of gases is not applicable for the majority of VOCs due to their weak absorption spectrum, particularly at low concentrations. Among different methods, gas chromatography can detect chemicals accurately [35]. However, chromatography equipment is expensive and generally non-portable, typically requiring sensitive and advanced instruments in a laboratory setting.

Studies on MPcs and MPPs have shown promising results when a thin solid film was used in form of a resistor being exposed to viral associated chemicals [20, 26]. The mechanism of detection is based on the interaction of the odorant molecules with the metal ion (i.e., Zn+, Cu2+, Co2+, etc.), serving as a Lewis acid site [20]. Since MPPs and MPcs are flat molecules (FIG. 2.b), binding molecules to the metal core distorts the Π-Π stacking and changes the conductivity of the thin-film [20]. The interaction of the metal core element in MPcs and MPPs is an effective method for the synthetic detection of various chemicals, indeed a similar mechanism has been found in natural odorant receptors [23]. However, conductivity changes in a thin film can be due to many factors (e.g., natural adsorption of any particle/molecule) and this can have an adverse effect on the accuracy/selectivity of the resistive sensors. In contrast, electrochemical detection provides an accurate method to verify different analytes even at low concentrations. Electrochemical gas sensors for the detection of $H_2$ and CO are available, however, challenges exist with such electrochemical gas sensors in effective capture of viral chemicals, gases, and molecules through a permeable membrane (FIG. 2.c) [36, 37].

Figure 3:
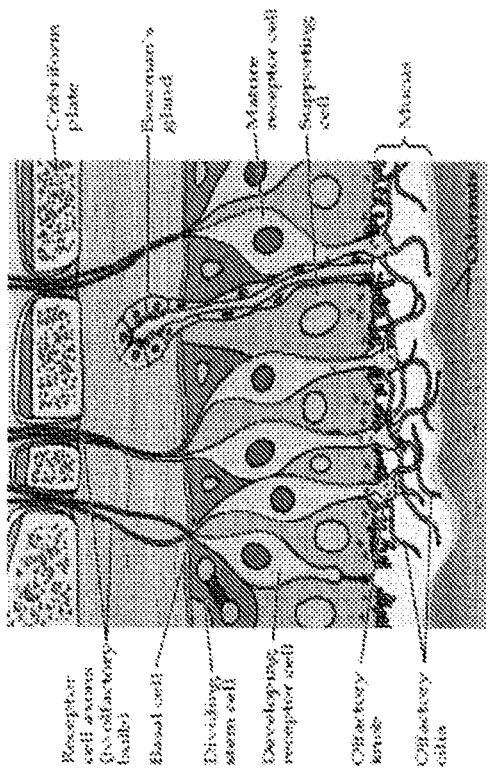

In comparison to the existing gas sensing technologies, the olfactory sensory system in humans and some animals (e.g., dogs) has a sophisticated design capable of distinguishing several thousands of different odors [1]. While recent advancements in e-nose technology largely rely on algorithms that mimic the data interpretation by the natural brain from an array of gas sensors, the elegant mechanisms of capturing and detecting odorants in the olfactory system have not been fully implemented in a sensing device. FIG. 3 shows a section of the olfactory epithelium in humans [38]. The olfactory neurons are equipped with odorant receptors (ORs) for detecting specific agents. ORs are essentially metalloproteins containing Cu, Mn, or Zn that interact with the odorant molecules with a similar mechanism to that of MPPs and MPcs [23]. However, the binding of odorant molecules with the metal atoms in ORs results in releasing ions, sending electrochemical signals to the brain. For the electrochemical interaction, the olfactory knobs and cilia are buried under a thin layer of mucus produced by Bowman's gland. Odorants are first captured by the mucus that contains odorant-binding proteins (OBPs) and then conducted to the ORs. Studies show that OBPs facilitate the absorption and transformation of odorants to the ORs [21, 22] making use of a liquid interface (i.e., mucus) between receptors and the air in the nasal cavity.

In certain embodiments of the present inventive concepts, we provide electrochemical sensors with a thin layer of electrolyte to mimic the olfactory system. MPcs and MPPs with various core metals are used for detecting different chemicals and may be used in an array structure for the concurrent detection of different gases and VOCs in human breath. To amplify the detected signal and improve the sensitivity, an ECT structure will be designed. Preferably, the echem-nose device is equipped with an nozzle for continued or constant dispensing of mucus to the sensors.

Gas sensors typically detect variations in electrical/optical/mass through a direct gas-solid interface [20], in contrast, the sensing mechanism in the biological natural olfactory system relies on gas-liquid-solid interface. A thin layer (e.g., 5-10 µm) of mucus that covers odorant receptors (ORs) acts as an interfacial media with the capability of capturing odorant molecules using free-floated odorant-binding proteins (OBPs) [21, 22]. At the same time, the mucus-OR interface allows electrochemical detection which is far more sensitive, reliable, and accurate than the detection mechanism in MOX sensors. Recent studies show that the presence of metal ions such as copper and zinc in ORs can be responsible for the detection of some chemicals [23]. Additionally, in humans and animals, the constant secretion of mucus from Bowman's gland generates a mist that improves capturing of viral molecules. The current disclosure describes a construct to mimic Bowman's gland and metalloprotein ORs and uses them in conjunction with natural or synthetic mucus electrolytes for an echem-nose.

Sensors with immobilized ORs from insects have been reported [24, 25], however, the stability of the immobilized ORs is a serious drawback limiting their practical applications. Furthermore, there is a knowledge gap in understanding the role of mucus on the sensitivity and limit-of-detection (LOD). To address the sensor stability and offer a solution for making disposable sensors, the present disclosure describes metal-based phthalocynines/porphyrins and derivative thereof instead of ORs. Various metallophthalocyanines (MPcs) and metalloporphyrins (MPPs) (in solid state forms) have shown strong responses to the gases [20, 26]. The present disclosure discusses the significant improvement in sensitivities when the MPcs and (MPPs) are applied in an electrochemical cell using a mucus electrolyte (natural or synthetic).

Prior research on electrochemical sensors [27-31] is helpful but does not yield the innovation disclosed herein, including that: (i) a thin layer of a natural mucus electrolyte can serve as an effective interface for capturing viral molecules; (ii) the electrochemical sensitivity and selectivity of MPcs and MPPs to various VOCs and gases depend on the selected metal ion and the structure of the compound molecule (it is feasible to design and use molecules with the increased sensitivities to particular analytes); and (iii) constant dripping of electrolyte on the sensor (e.g., via a nozzle) can improve the limit of detection (LOD).

Analyzing breath samples can be an effective method of identification of infection in some instances [32]. However, reusing a sensing device can transfer pathogens from one individual to another, it is desired to provide a low-cost breathalyzer with disposable sensors. The present disclosure provides an echem-nose with stable MPcs/MPPs-base detectors, mucus electrolyte, and a mechanism of dripping an electrolyte with a nozzle such as an inkjet nozzle. This provides a low-cost solution for disposable sensors with high sensitivities and high specificities for the detection of a large range of VOCs and gases at very low concentrations. Such a device can be used not only for screening but importantly as a medical diagnostic tool. Additionally, the device has application in the agriculture/food industries for controlling the quality of products and in military and environmental engineering for the detection of hazardous chemicals.

In one embodiment, a new sensing system is provided, including both synthetic (i.e., MPcs and MPPs) and biological (i.e., natural mucus containing OBPs) materials in a structure that mimics nature's olfactory system. The proposed sensing modality can be used for the detection and measurement of some VOCs (e.g., acetone, ethanol, isopropanol, acetic acid) and gases (e.g., CO, $NH_3$, NO) at least as low as at the ppm (parts per million) level. The selected VOCs and gases are the major chemicals in human breath indicating a person's health status [32].

In one embodiment, cellulose-based electrodes with a coating of MPc is used with synthetic or natural mucus, for instance, bovine, canine or human mucus. Using cyclic voltammetry (CV) and electrochemical impedance spectroscopy (EIS), the cells may be tested while being exposed to various target chemicals.

A variety of different metal ions and different MPcs and MPPs may be used in the detection of different types of VOCs and gases. For instance, various MPcs and MPPs (with different moieties) are suitable for detecting acids (e.g., acetic acid), alcohols (i.e., isopropanol, ethanol), ketones (e.g., acetone), and other gases (e.g., $NH_3$, CO, NO). A thin coating layer of MPcs/MPPs is applied on a porous electrode. CV, EIS, and chronoamperometry tests detect effect the sensor response when being exposed to the VOCs and gases. Variations in the responses between similar molecular structure with different metal ions identify the most suitable structures and ion combinations. In a preferred embodiment, a variety of ions and MPcs and MPPs are provided in an array of sensors for the detection of various VOCs and gases.

Conventional resistive sensors rely on a change of a material's conductivity when exposed to chemicals. Instead, what is disclosed herein is an electrochemical transistor (ECT), where variations in conductivity can be amplified to achieve higher sensitivities and resolution. Additionally, to achieve a fast response and a low limit of detection (LOD), a thin layer of electrolyte may be used. Natural evaporation of electrolyte, may cause the sensor to lose electrolyte. A nozzle above the sensor can be programmed to detect and compensate for the electrolyte loss, or simply provide additional electrolyte on a timed basis, thereby assisting in capturing the viral odorant molecules. A commercially available inkjet nozzle may be used to study the effect of constantly adding mucus electrolytes on LOD and the sensitivity of the sensors.

In one embodiment the design of the human olfactory system for the detection of various chemicals is emulated using an array of relatively inexpensive and disposable sensors in the form of an echem-nose. Relying on the electrochemical signals (e.g., redox potential) from MPcs/MPPs and the implementation of electrochemical transistors (ECTs), the echem-nose offers high accuracy, great sensitivity and reliability in the detection and measurement of chemicals in human breath for use with detection and diagnostic applications.

BRIEF DESCRIPTION OF THE DRAWINGS

Features of the present invention will become apparent to those skilled in the art from the following description with reference to the figures, in which:

FIG. 1 depicts how the echem-nose (b) mimics the natural olfactory system (a).

FIG. 2*a* depicts interactions of oxygen atoms with adsorbed chemicals.

FIG. 2*b* depicts the generally planar, two-dimensional structure of MPPs and MPcs.

FIG. 2*c* depicts an exemplary gas detector with a membrane.

FIG. 3 depicts features of the natural olfactory system.

FIG. 4 depicts CV results from glucose sensors from (SEM-right) conducting polymer nanofibers with and without (SEM-left) SiC NPs [41].

FIG. 5*a* compares electrical resistance response with a dry CuPc electrode vs. a wet electrode.

FIG. 5*b* shows the electrical current response through the sensor biased at 2 V, including the response of the dry vs. wet sensor to $NH_3$.

FIGS. 6*a*, 6*b*, 6*c*, 6*d*, and 6*e* the use of an organometallic compounds in an ECT was demonstrated using a planar 3-electrode design with two carbon electrodes (employed as drain and source). One silver reference electrode (used as the gate contact) was used to make an ECT 6*a* and 6*d*. FIG. 6*e* shows that the drain current can be amplified through gate biasing.

FIG. 7 shows various exemplary target VOCs and gases for detection.

FIG. 8 is a block diagram showing components of an apparatus for testing a form of an echem-nose.

FIGS. 9*a* and 9*b* show the effect of different substrate materials on an electrolyte.

FIGS. 10A, 10B and 10C show features of and related to embodiments of an exemplary e-chem nose. FIG. 10A shows a schematic view of an ECT sensor with a nozzle, where the nozzle is from an inkjet cartridge as shown in FIG. 10B.

FIG. 10C shows a schematic view of the disposable sensor of FIG. 1*b* with gate electrodes and an array of different MPPs/MPcs for the detection of various chemicals.

FIG. 11 shows exemplary MPcs and MPPs for use in accordance with certain embodiments.

FIG. 12 depicts features of an embodiment similar to FIG. 1, adding an LED light source and showing another embodiment on the sensor.

FIGS. 13*a*, 13*b*, 13*c* and 13*d* depict features of various embodiments of sensors.

FIG. 14 depicts features of an embodiment similar to FIG. 1, adding an LED light source to illuminate a sensor array.

FIG. 15 depicts features of an embodiment similar to FIG. 1, adding an inkjet nozzle with a reservoir and an electronic circuit to read electrochemical signals from the sensor or sensor array.

FIGS. 16*a*, 16*b*, and 16*c* show different versions of a separator arrangement in fluid communication with a reservoir holding the electrolyte with a vertical or horizontal sensor.

FIG. 17 depicts a variety of features of the embodiments of the disclosure, including a disposable mouthpiece for an exemplary echem nose breathalyzer with a sensor wetted by capillary action of the electrolyte.

FIG. 18 shows a three-electrode electrochemical and related data.

FIG. 19 shows an exemplary two (paper) electrode embodiment and related data.

FIG. 20 shows a paper-based ECT configuration.

FIG. 21 shows (a) MPc coated CNT/paper electrode, (b) SEM image of CuPc coated electrode after the exposure to isopropanol, (c) schematic of the cell showing the working electrode, counter electrode, porous membrane separator in the middle, and the electrolyte reservoir, (d) the actual cell placed inside the test box, (e) schematic of the test setup, and (f) the actual test setup.

FIG. 22 shows the CV response of a sensor with the CoPc coating.

FIG. 23 shows chronoamperometry tests on a sensor.

FIG. 25 shows testing using trifluouroacetic acid as the chemical to be detected.

DETAILED DESCRIPTION OF PREFERRED EMBODIMENTS

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about."

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

Any or all of three fundamental mechanisms in the natural olfactory system may be implemented in an array of electrochemical sensors (e.g., an echem-nose) using synthetic chemoreceptors with a thin film of a synthetic or natural nasal mucus from human, bovine, or canine sources as the electrolyte. The natural detection process includes: (i) capturing viral molecules via constant secretion of mucus through Bowman's gland in the nasal cavity; (ii) effective capture and transportation of odorant molecules via free-floated odorant-binding proteins (OBPs) in the mucus; and (iii) electrochemical detection of the odorants via the odorant receptors (ORs). Mimicking the olfactory system, as shown in FIG. 1 herein, it is proposed to design the echem-nose with an inkjet nozzle dropping natural mucus electrolyte over the sensors. An array of electrochemical transistor (ECT) sensors made from metallophthalocyanines (MPcs) and metalloporphyrins (MPPs) and/or derivatives thereof with various metal ions are used for the electrochemical detection of various volatile organic compounds (VOCs) and some gases. The MPc/MPP-base sensors can mimic the function of metalloprotein ORs for the detection of various odorants with a chemical and thermal stability far better than natural ORs. The proposed echem-nose can be used in a breathalyzer as a point-of-care (PoC) diagnostic device or as a screening tool in public or private locations.

FIG. 1 depicts elements of an exemplary system in accordance with the disclosure provided herein, including an inkjet nozzle for delivering mucus electrolyte, which may include OBPs, to a sensor having a synthetic chemoreceptor in the form of an MPcs, MPPs and/or derivatives thereof, which may be in the form of a sensor array, which may be disposable. Molecules to be detected, e.g. viral molecules (i.e. molecules indicating a sample is from a patient having a virus or condition), or gases or other molecules to be detected pass over the sensor and are captured by the electrolyte where they can react with the chemoreceptor.

In one example seven VOCs and gases were identified to be detected in human breath (i.e., acetone, isopropanol, ethanol, acetic acid, CO, $NH_3$, and NO) for diagnosing patients with respiratory symptoms [39]. This system had a disadvantage of being nondisposable and it was difficult to effectively disinfect the sensors. Accordingly, a system with disposable sensors addresses these issues.

Figure 4:
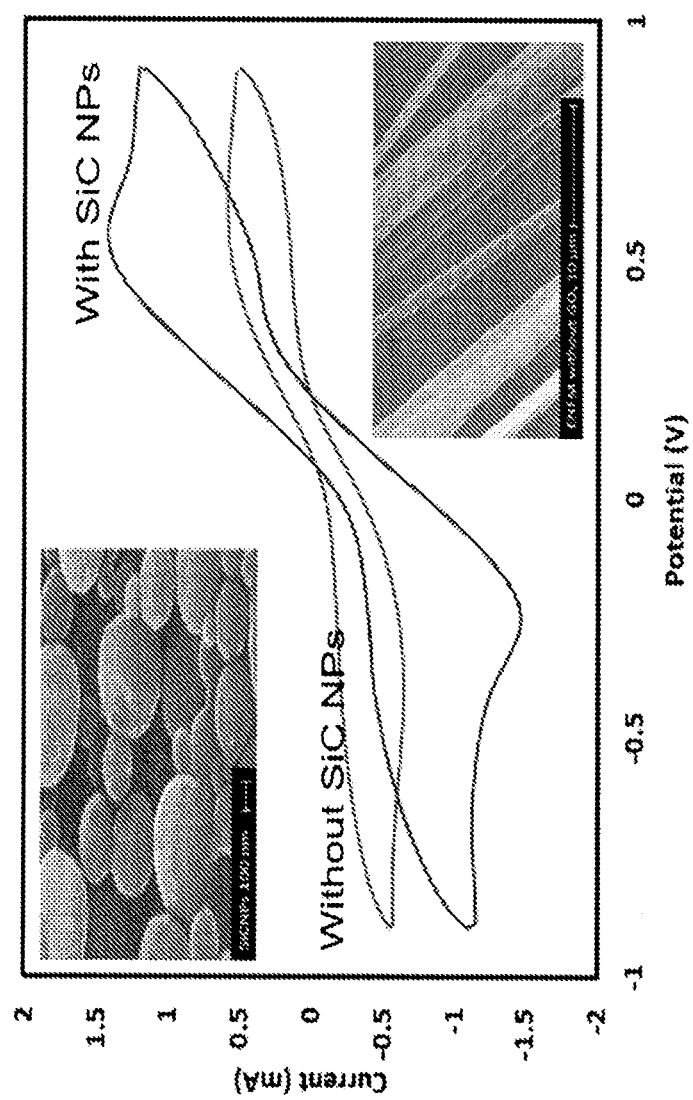

A miniaturized glucose sensor may be fabricated by electrospinning a micron thick layer of nanofibers made from a conducting polymer (i.e., PEDOT:PSS) decorated with SiC nanoparticles (NPs) (FIG. 4). Using the fibrous structure of the electrode, the electrode surface was wet with a thin electrolyte layer (~10 μm) through the capillary effect. The redox peaks in the CV results verify the practicality of using a thin electrolyte layer for the electrochemical detection of an analyte [40, 41].

Figures 5A, 5B:
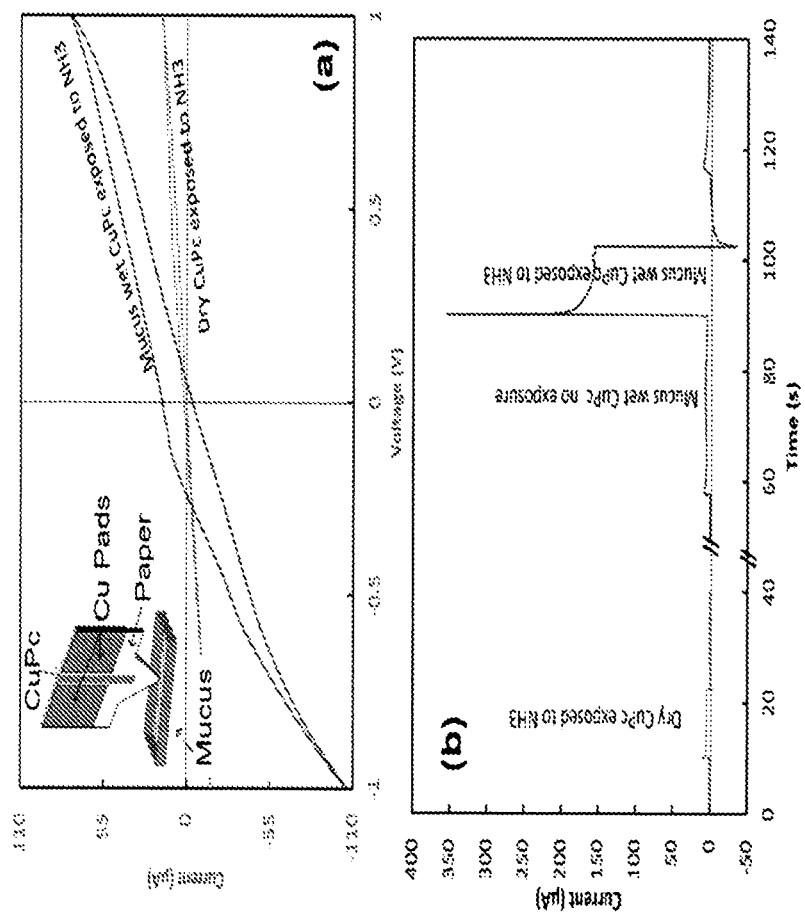

To verify the capability of mucus for capturing viral molecules, a paper base gas sensor was made by dropping 50 μl of a solution containing CuPc. Two copper electrodes were applied across the sensing area to make a resistive gas sensor (inset FIG. 5.a). CuPc has been previously in the detection of ammonia [42, 43]. FIG. 5 shows clearly the effect of wetting the paper substrate with a nasal mucus electrolyte (from human) on the CV response (FIG. 5.a) and the current through the sensor biased at 2 V (FIG. 5.b) which also shows the response of the sensor to $NH_3$. This shows the application of mucus electrolytes for the effective capture of $NH_3$ and other viral molecules.

Figures 6A, 6B, 6C, 6D, 6E:
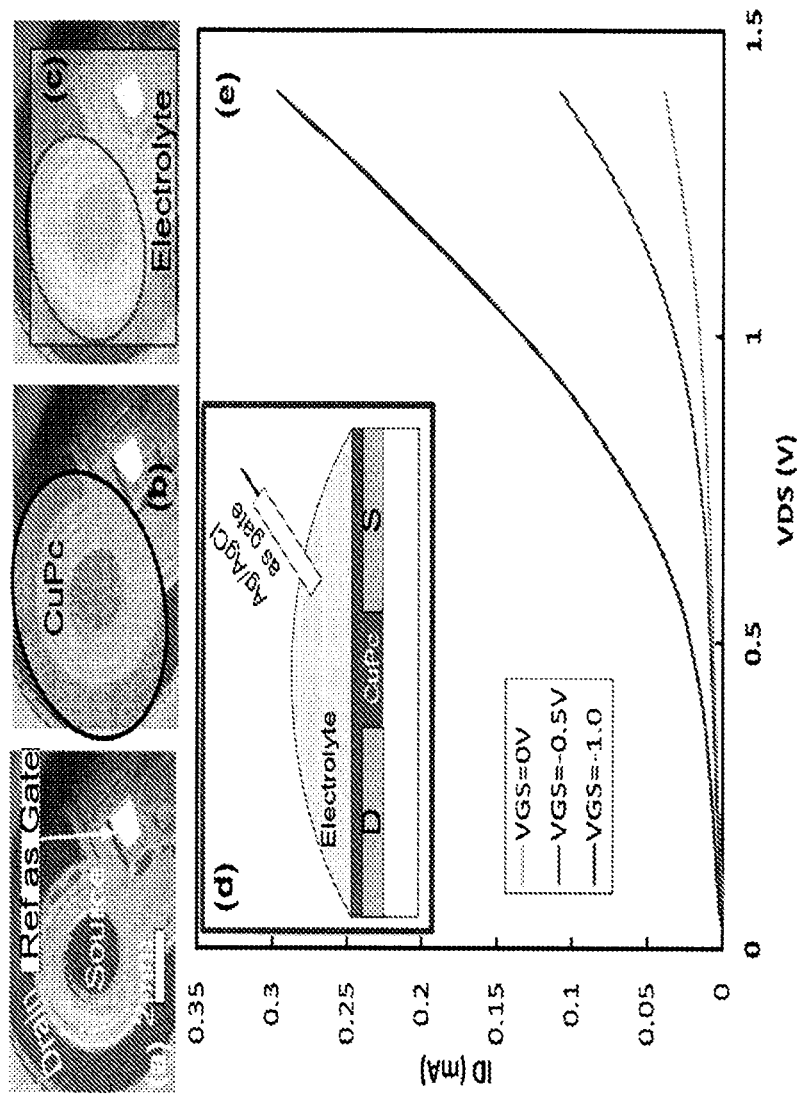

The feasibility of using the organometallic compounds in an ECT was demonstrated using a planar 3-electrode design with two carbon electrodes (employed as drain and source). One silver reference electrode (used as the gate contact) was used to make an ECT (FIG. 6). A thin layer of CuPc was drop cast between the two carbon electrodes and then a droplet of a Tris-buffer was applied over the CuPc and the reference electrode. Although the conventional saturation and triode mode operation of the transistor was not observed (FIG. 6.e), it is evident that the drain current can be amplified through the gate biasing.

There are at least 231 identified VOCs [44]. In certain embodiments, this disclosure is aimed at detecting acetone, ethanol, acetic acid, and isopropanol (FIG. 7) [2, 3, 39]. Other compounds such as ethylbutanoate, acetaldehyde, propylacetate, and others have been detected in human breath, but these are not known to be related to diseases such as COVID-19 [32]. In addition to those four particular VOCs, measuring the concentrations of $NH_3$, NO and CO are required (in total seven VOCs and gases) for providing an effective breathalyzer [32]. The approximate level of VOCs in human breath is typically between 0.2 and 4.0 ppm [45, 46]. Therefore, the gas sensors disclosed herein preferably have a sensitivity and minimum level of detection (LOD) better than 0.1 ppm and 0.2 ppm, respectively.

A variety of porphyrins may be used in accordance with the teachings herein, including, without limitation:
tpyp=5,10,15,20-tetrakis(4-pyridyl)porphine;
mpyp=5-monopyridyl-10,15,20-triphenylphorphine;
trans-dpyp=5,15-dipyridyl-10,20-diphenylporphine;
tcp=5,10,15,20-tetrakis(4-cyanophenyl)porphine;
t(3-py)p=5,10,15,20-tetrakis(3-pyridyl)porphine;
tdpap=5,10,15,20-tetrakis(4,40-dipyridylaminophenylene)porphine;
tmpp=5,10,15,20-tetrakis(3,4,5-trimethoxyphenyl)porphine;
tpps=tetrakis(4-sulfonatophenyl)porphine;
trans-dcpp=5,15-di(4-carboxyphenyl)-10,20-diphenylporphine;
cis-dcpp=5,10-di(4-carboxyphenyl)-15,20-diphenylporphine;
bdcpp=5,15-bis(3,5-dicarboxyphenyl)porphine;
dcdbp=5,15-bis(3,5-dicarboxyphenyl)-10,20-bis(2,6-dibromophenyl)porphine;
bdcbpp=5,15-bis(3,5-dicarboxybiphenyl)porphine;
tcpp=5,10,15,20-tetrakis(4-carboxyphenyl)porphine;
tmcpp=5,10,15,20-tetrakis(m-carboxyphenyl)porphine;
tcmopp=5,10,15,20-tetrakis[4-(carboxymethyleneoxy)phenyl]porphine;
tcpep=5,10,15,20-tetrakis(4-carboxyphenyl)ethynylporphine;
tcbpp=5,10,15,20-tetrakis(4-carboxybiphenyl)porphine;
tdcpp=5,10,15,20-tetrakis(3,5-dicarboxyphenyl)porphine;
tbcppp=5,10,15,20-tetrakis[3,5-bis(4-carboxyphenyl)phenyl]porphine;
tdcbpp=5,10,15,20-tetrakis(3,5-dicarboxybiphenyl)porphine85)

Porphyrin derived MOFs may also be used in making suitable electrodes, such as those listed in Table A:

TABLE A

| Common name | Chemical formula (guest molecule ignored) |
|---|---|
| PIZA-1 | [CoT(p-$CO_2$)PP$Co_{1.5}$) |
| PIZA-4 | [Zn(p-$CO_2$)$P_2$$Mes_2$P]$_3$$Zn_4$O |
| [$Cu_2$(AcO)$_4$(CuTPyP)$_{1/2}$] | [$Cu_2$(AcO)$_4$(Cu-tpyp)$_{1/2}$] |
| PPF-1 | [$Zn_2$(Zn-tcpp)] |
| ZnPO-MOF | [$Zn_2$(1)(Zn-2)] |
| | 1 = 1,2,4,5-tetrakis(4-carboxyphenyl)benzene |
| | 2 = (5,15-dipyridyl-10,20- bis(pentafluorophenyl))porphyrin |
| ZnMn-RPM | $Zn_2$($L^1$)($L^2$) |
| | $L^1$ = Zn-tcpp |
| | $L^2$ = (5,15-dipyridyl-10,20- bis(pentafluorophenyl))porphyrinMnCl |
| BOP | $Zn_2$(Zn-$L^2$)($L^3$) |
| | $L^2$ = tcpp |
| | $L^3$ = boron dipyrromethene (bodipy) |
| MIL-141(A) | Fe(Ni-tcpp)A |
| | A = Li, Na, K, Rb, Cs |
| $Zn_4$-ZnTCPEP-DABCO | $Zn_4$-($\mu_3$-OH)$_2$($H_2$O)$_2$(Zn-tcpep-H)$_2$ (DABCO) |
| MMPF-1 | $Cu_2$(Cu-bdcpp)($H_2$O)$_2$ |
| MMPF-2 | [Co(n)$_3$(OH)($H_2$O)]$_4$(Co(n)tdcpp)$_3$ |
| MMPF-3 | [$Co_2$($\mu_2$-$H_2$O)($H_2$O)$_4$](Co-dcdbp) |
| MMPF-4 | [$Zn_{19}$(tdcpp)$_3$][($NO_5$)$_8$] |
| MMPF-5 | $Cd_8$(Cd-tdepp)$_3$][$H_3$O]$_8$] |
| Al-PMOF | $H_2$tcpp[AlOH]$_2$ |
| Al/Zn-PMOF | $Zn_{0.986}$-tcpp[AlOH]$_2$ |
| [$Cu_2$(MDDCPP)] | [$Cu_2$(M-ddcpp)] |
| | M = $Zn^{2+}$, $Ni^{2+}$, $Pd^{2+}$, $Mn^{3+}$ ($NO_3$), $Ru^{2+}$(CO) |
| MOF-525 | $Zr_6$$O_8$(OH)$_4$(tcpp-$H_2$)$_3$ |
| MOF-545 | $Zr_6$$O_8$($H_2$O)$_8$(tcpp-$H_2$)$_2$ |
| PCN-222 (Fe) (isostructural MOF-545) | $Zr_6$$O_8$($H_2$O)$_8$(FeCl-tcpp)$_2$ |
| MMPF-6 (isostructural MOF-545) | $Zr_6$$O_8$($H_2$O)$_8$(FeCl-tcpp)$_2$ |
| MMPF-5 (Co) | [$Cd_8$(Co-tdcpp)$_3$][($H_3$O)$_8$] |
| MMPF-7 | [$In_{1.29}$$O_{0.57}$ (tcpp)] |
| MMPF-8 | [In(In-tcbpp)) |
| MMPF-9 | $Cu_6$(Cu-tdcbpp)(HCO$_2$)$_4$($H_2$O)$_6$ |
| CZJ-1 | $Zn_2$(MnOH-tcpp)(DPNI) |
| | DPNI = N,N'-di-(4-pyridyl)-1,4,5,8- naphthalenetetracarboxydiimide |
| Zr-PCN-221(no metal) | $Zr_8$$O_6$(tcpp)$_3$ |
| Zr-PCN-221(Fe) | $Zr_8$$O_6$(FeCl-tcpp)$_3$ |
| Hf-PCN-221(Co) | $Hf_8$$O_6$(Co-tcpp)$_3$ |
| PCN-224 | ($Zr_6$$O_{20}$)$_2$(Ni-tcpp)$_3$ |
| PCN-225 | $Zr_6$($\mu_3$-O)$_4$($\mu_3$-OH)$_4$(OH)$_4$($H_2$O)$_4$($H_2$ tcpp)$_2$ |

As used herein the term metallophthalocyanine (MPc) refers to any phthalocyanine having a metal (optionally a transition metal) at its core. The term metalloporphyrin (MPP) refers to any compound formed by a combination of a porphyrin and a metal. Also contemplated for use in place of any MPc or MPP are the derivatives thereof, to include, without limitation, derivatives thereof made with side chains to the macromolecule. Exemplary side chains can be single atoms such as a halogen, including, without limitation, F or Cl, or substituted or unsubstituted alkyl (preferably $C_1$-$C_4$), including methyl and/or ethyl, or carbon ring structures, such as, phenol, which may be substituted or unsubstituted.

Figure 7:
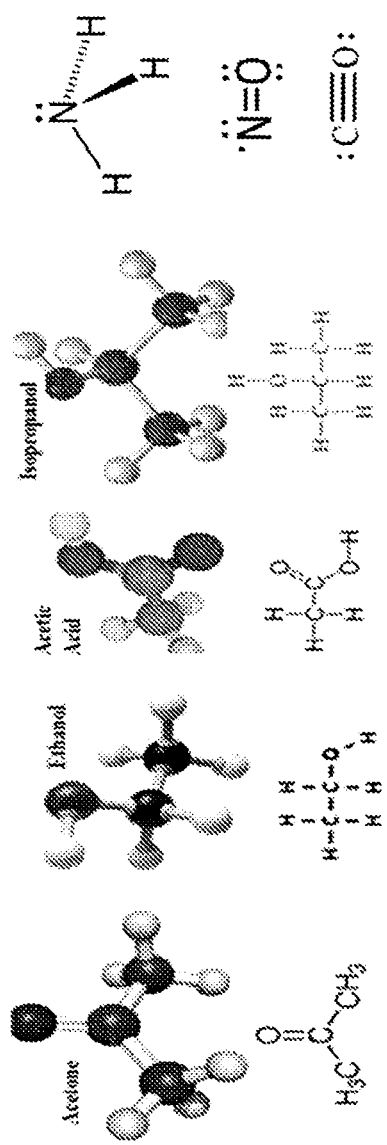

Disclosed herein are detectors having different natural mucus electrolytes from human, canine, and bovine sources, such as that shown in the inset in FIG. 5. Suitable testing involves CuPc in a resistive device testing for response to ammonia, with different mucus electrolytes. Various MPcs and MPPs with different metal ions may be used depending on the sensitivity of each material to the identified target VOCs and gases (FIG. 7). The coupling between the Lewis acid (organometallic compounds) and Lewis base (target chemicals) is of importance to identify the choices of chemoreceptors. A preferred device will have a collection of ECTs including one ECT with suitable or even the highest sensitivity to one of the target chemicals, so that each of the target chemicals maybe accurately detected. A thin film of mucus electrolyte is also provided. A suitable apparatus to maintain the mucus layer, such as a constant feed or drip, or a commercial nozzle just as an inkjet nozzle coupled to a fluid reservoir filled with the mucus electrolyte. An electronic system may be provided with suitable heating and/or cooling capacity to control the temperature of the substrate for simulating the condition in the nasal cavity. The same or a separate electronic system may also control the timing and amount of mucus electrolyte released. The electronic system may include computer controlled systems.

The selected MPcs/MPPs and their derivatives may be sensitive to multiple target chemicals, as such, the echemnose device may include a computer with memory and a processor configured to run operations and an algorithm to receive data including signal measurements from several different ECTs and process the data to determine the presence and concentrations of different chemicals in the sample being tested. In one embodiment an algorithm based on the k-nearest neighbors' classification may be used.[47].

The present device represents significant progress in developing technology related to the mechanisms of capture and detection of chemicals and odorants in the natural olfactory system as well as synthetic systems, including the use of synthetic mucus as an electrolyte, synthetic detectors, and synthetic processing of data and measurements generated by the detectors.

Figure 8:
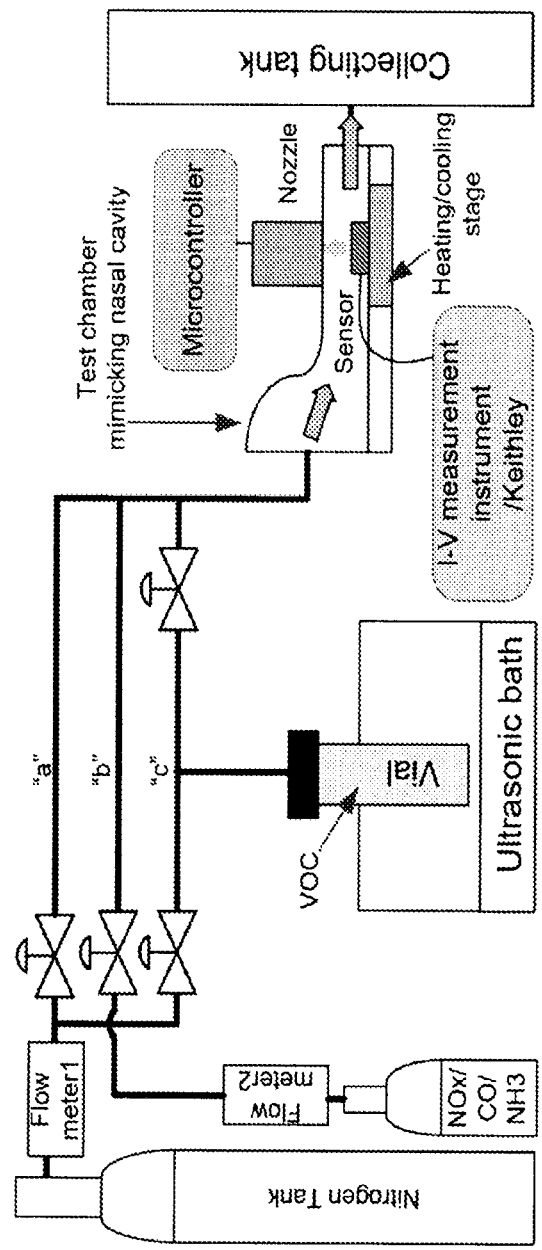

As depicted in FIG. 8, a mist generating system similar to the one described by Saito et al. [48] may be implemented and used for sample collection and transmission to a sensor chamber. Sample reagent may be dissolved in water by causing sample reagents make contact with a mist of microdroplets. Sample reagents with the microdroplets in the air can be aspirated into a collection tube through a suction motor. Then, only the sample solution shall remain in the collection cylinder by gas/liquid separation. To fulfill this concept, a mist generator operates in conjunction with a water atomizer, e.g. an ultrasonic vibration element that may be placed at the bottom of the mist generator. The generated mist may be released through the airflow of a motorized fan.

A sensor similar to that of FIG. 1 may be used and here a chamber is provided to house the sensor and channel or create a passage for the gas to pass over the sensor. The nozzle for the electrolyte shown is operated by a microprocessor or microcontroller and may be an inkjet nozzle or inkjet style nozzle.

Figure 15:
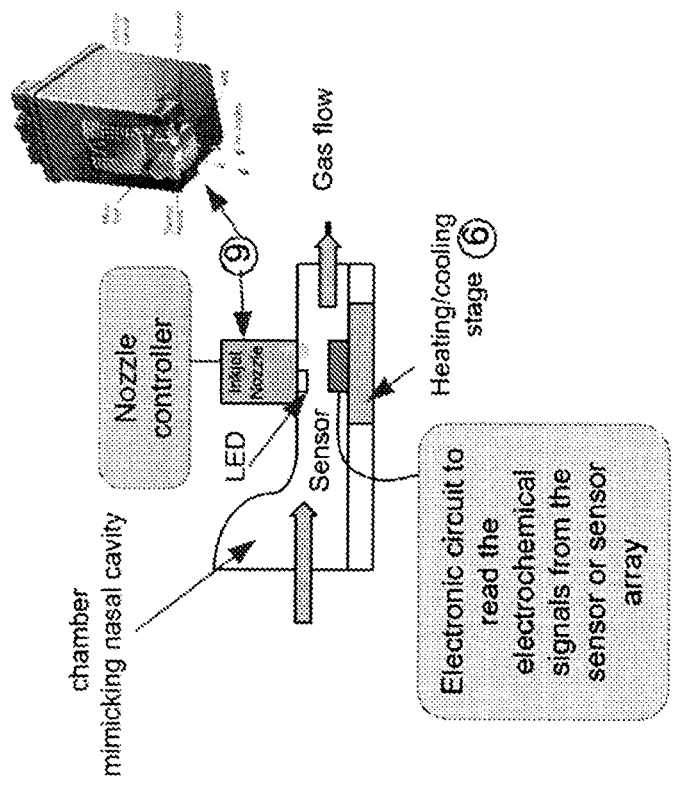
Figure 16:
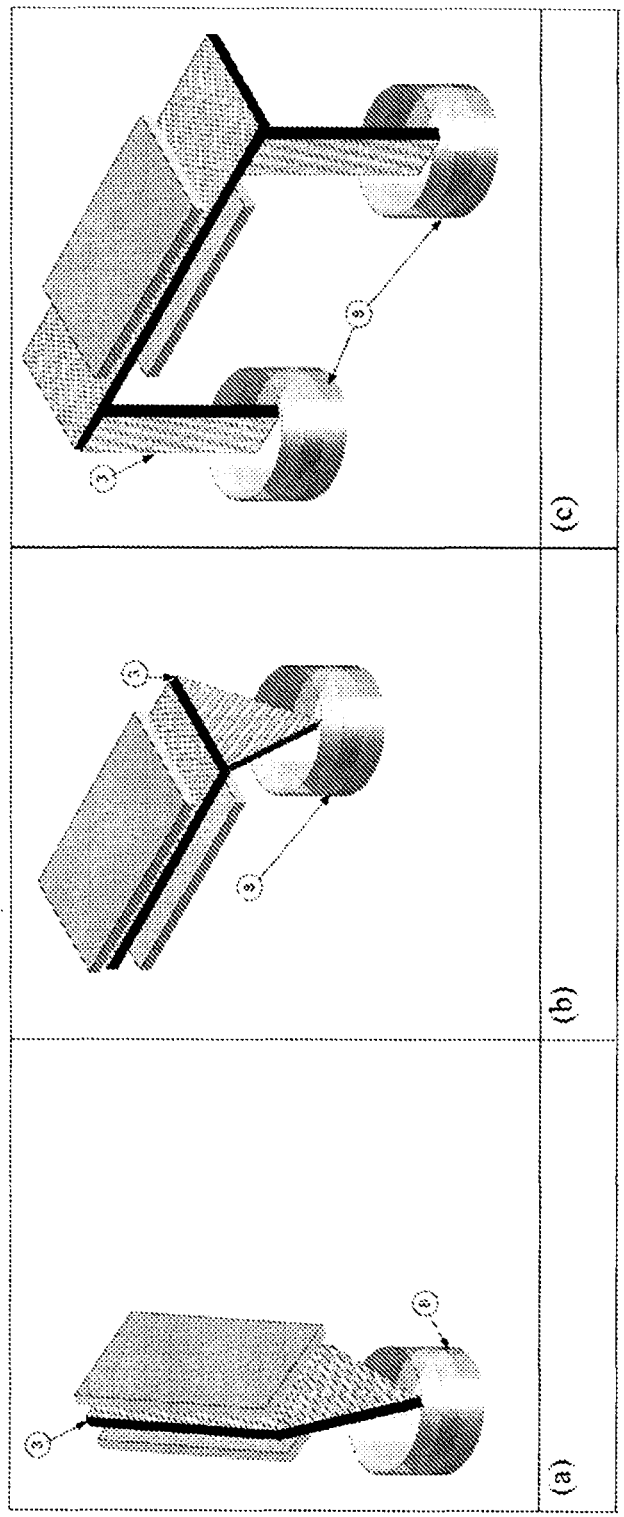

In one embodiment a stainless-steel sensor chamber is used to house the sensors (ECTs), electrolyte and, optionally, a heating and/or cooling stage. The sensor chamber may mimic the shape of a nasal cavity, as shown in FIG. 15. A nitrogen tank may supply the main gas stream. Controlling the flow and pressure, $N_2$ can be directly conducted (via line "a" in FIG. 8) to the sensor chamber where the sensor is located. Using lines "a" and "b", the feeding gas at a desired concentration and flow rate can be mixed with CO/NO/$NH_3$. For testing the samples with VOCs, the nitrogen will be conducted through line "c" to pass over a vial containing VOC. Placing the vial into an ultrasonic bath, the applied heat and vibration generate mists of the VOC that will be carried out with the main nitrogen stream and enter into the sensor chamber. Controlling the temperature and power of the ultrasonic bath and adjusting the flow of the main nitrogen stream, the concentration of the inserted VOC to the chamber can be set at different ppm levels. To calibrate the ppm of the inserted VOCs, the amount of consumed VOC in the vial may be considered with respect to the volume of nitrogen gas being fed into the chamber in a period of time. The collecting tank ensures the safety of the experiments by protecting the lab environment against the released chemicals. Also, the sensor can be placed on a Peltier cell that can lower the temperature, to 4° C. (for slowing the electrolyte evaporation) or increase the temperature up to 40° C. to mimic the thermoregulation in the human body. Alternatively another style of suitable heating and/or cooling device may be used and placed in proximity to the sensor as shown in FIG. 8. In a preferred embodiment an inkjet nozzle is in fluid communication with a reservoir and is controlled by a microcontroller circuit to control the timing, volume, and overall rate of mucus release.

The chemical composition of mucus has been studied [49], however detailed reporting on physical and electrochemical characterization of mucus is unavailable, including measurements of conductivity, viscosity, hydrophobicity, evaporation rate, and pH of mucus samples from humans, bovines, and canines. Natural nasal fluid from healthy human donors and bovines is commercially available (e.g., leebio.com). Additionally, synthetic mucus may be used as an electrolyte.

Characterizing and/or normalizing mucus samples, including at their original and diluted concentrations, for instance, may ensure consistency across measurements taken with different mucus electrolyte samples or different instruments, different environments, or ambient conditions. Deionized (DI) water may be used to dilute the natural samples. Using mucus as the electrolyte, conductivity is an important parameter. The four-probe technique may be used to measure the conductivity of thin films of gels of an electrolyte and may be used to measure the conductivity of the mucus samples. Additionally, the mucus rheology and/or viscosity may be important and is preferably consistent for ensuring the electrolyte serves its purposes of wetting the ECTs and contacting the gas molecules being detected. Consistency of the mucus electrolyte may be beneficial to ensure accurate and repeatable inkjet dropping and sufficiently fast transfer of the captured viral agents or gas particles. A viscometer may be used to characterize the mucus samples (original and diluted), including at different temperatures. Mucus hydrophobicity and pH may also be measured and used in constructing the suitable porous electrode structure. Using the contact angle measurement and a digital pH meter, the hydrophobicity and pH of the natural mucus samples can be measured, for instance using a glass slide and microscope camera. The evaporation rate of the electrolyte may be estimated using a thin film of the mucus electrolytes on the glass slide. Due to the mucus composition (which includes polyelectrolytes) [49], the mucus evaporation rate is typically slower than DI water. Repeating this testing at different temperatures will give a data set that may be used to construct an evaporation curve over a temperature range. To slow evaporation, the temperature can be reduced, for instance as low as 4° C. (a reasonable temperature above the freezing point). To increase evaporation, the temperature may be increased. Preferably, the temperature is in the range of 4-40° C.

As used herein the term mucus refers to mucus from a human or animal, include canine, bovine, and equine sources. A mucus based electrolyte may be 100% mucus or any percentage ranging from 1-100%, expressly including each and every single digit in that percentage range, i.e. 2%, 3%, 4%, etc. all the way up to 100%. Suitable diluents for mucus may include water, gels. Preferably the diluent is water or water based. As used herein, an electrolyte includes a medium containing ions that is electrically conductive. The electrolyte may includes most soluble salts, acids, and bases dissolved in a polar solvent, such as water. Accordingly, a liquid electrolyte comprising a predetermined amount of at least one of a natural mucus and a synthetic mucus may include an amount of mucus of from 1%-100%, expressly including each and every single digit in that percentage range, or, for instance 10-90%, 20-80%, 30-70%, 40-60%, 50%, or any of these exact percentage amounts.

Suitable mucus may be tested in electrochemical experiments using planar electrodes (for instance screen printed electrodes) with three electrodes (a silver reference, carbon working and a counter electrode) being present on a single substrate (FIG. 6.*a*). A droplet of 1-5 µl of mucus electrolyte is applied to cover all three electrodes. With an electrode size of approximately 5×5 mm2, an electrolyte layer with a thickness of 4-200 µm will cover the electrodes. CV is useful to identify the redox activity of the electrolyte. Also, EIS may be performed to obtain detailed information about the mass transfer properties and limitations in the electrolytes. Results may be compared against a buffer solution (e.g., phosphoric buffer) as a reference electrolyte. The tests are repeated after coating the working electrode once with a thin layer of metal-free Pc and another time with a CuPc layer. Ammonia gas will be used to test the capability of different mucus electrolytes in capturing viral odorant molecules, using the electrodes with the CuPc coating. A three electrode electrochemical study may yield more useful information than a study performed with a two-terminal (resistive) device. Testing the electrodes with different mucus electrolytes will provide data to compare different mucus types, e.g., human, canine, bovine. Comparisons between scent trained and untrained dogs, different dog breeds, or even individual dogs may be performed. Data may be collected indicating the strength of the electrochemical response as well as the response time of each mucus being tested with CuPc exposed to $NH_3$. Additionally, different thicknesses of mucus electrolyte layer may be tested.

Figures 9A, 9B:
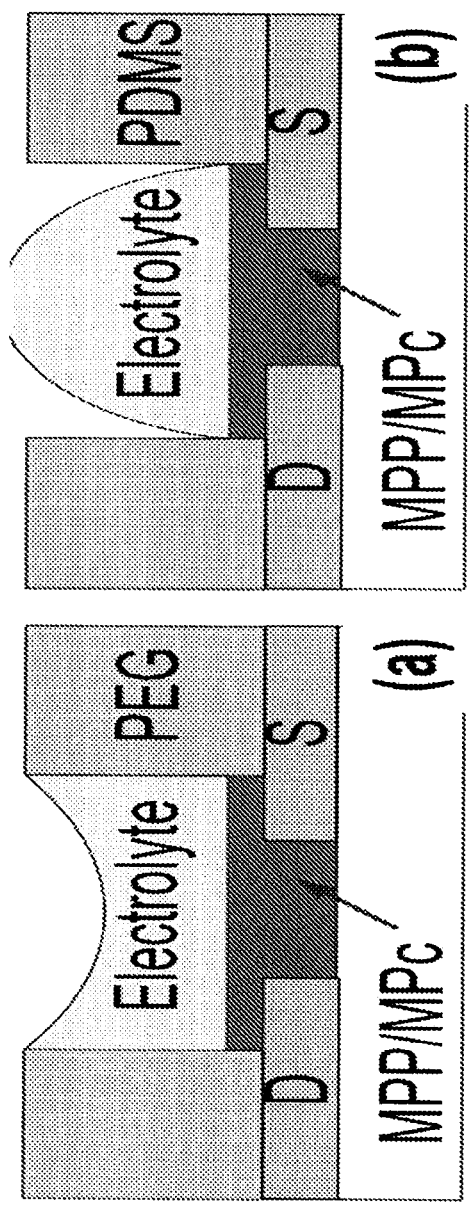

The e-nose gas sensor with a thin electrolyte layer, is constructed based on data related to a variety of factors which may include any of: the mucus evaporation rate, the flow of gas over the liquid or gel-like electrolyte, and the effect of temperature on the diffusion of captured gas molecules or odorants. The aim is to achieve high sensitivity, fast response, and improve the sensor LOD. In a preferred embodiment, a reservoir or pool-shaped is provided to contain or hold the electrolyte on top of the sensing area. In one embodiment, the pool can be made by the conventional lithography using a hydrophilic (e.g., polyethylene glycol (PEG)) or a hydrophobic (e.g., polydimethylsiloxane (PDMS)) material for the walls. As shown in FIGS. 9*a* and 9*b*, depending on the hydrophobicity of the material being used to make the pool, the liquid surface of the electrolyte may form a concave or convex shape. The preferred design may be determined based on the desired liquid curvature and factors such as evaporation rate, interaction with a laminar flow of gas over the sample, and the diffusion of gas or odorant molecules from the surface of the liquid to the bottom of the cell.

Studies of the olfactory system show that odorant receptors are metalloproteins [23]. The interaction of odorant molecules with the metal ions in ORs results in generating signals for the brain. Thousands of different receptors have been identified in humans and animals as useful to distinguish various odors. The structure of these receptors is different and different metal ions have been identified in ORs. Experiments conducted by Duan et al., show the role of copper ion in a mouse OR (i.e., MOR244-3) for the detection of thiols and sulfur containing compounds. Also, zinc, manganese, and other metal ions have been found in different ORs [50]. The detection mechanism is thought to involve the interaction of the empty orbital of the metal ion acting as a Lewis acid with a paired electron orbital (in N or O) of a VOC or gas molecule acting as a Lewis base. The weak bond between the odorant and OR deforms the OR structure and electrochemically releases ions. The presence of oxygen, nitrogen, and sulfur, in the VOCs and gases that we exhale can act as Lewis bases (see FIG. 7). However, for effective coupling between a Lewis acid and a Lewis base, molecular coordination may be important. Due to the weak bond and the physical adsorption of viral molecules, the direct interaction of the odorant molecule with a synthetic receptor in a gas-solid interface may result in a relatively weak signal. In contrast, in the olfactory system, a gas-liquid-solid interface is employed. The captured viral molecules (by the mucus) trap the odorants in the liquid and improve the coordination alignment in the Lewis acid-base bond. Also, the presence of the OBPs in mucus is believed to have a crucial role in both effective capturing viral molecules and deliverance of them to the ORs [21,22]. Our data shows that a thin mucus layer has a significant effect on the detection of ammonia by a CuPc film.

The mechanism of detection by MOX sensors relies on the redox reaction between the sensor materials and the VOC/gas molecules (see FIG. 2.a). The redox state of the metal atom in organometallic compounds such as MPcs and MPPs can change due to contact with another chemical. The e-nose sensor operates, in certain embodiments, based on the specificity and sensitivity of the MPcs and MPPs to the VOCs and gases and the electrochemical reactions.

Pcs and PPs without any core atom or with Cu, Zn, Co, Mg, Mn, Fe, Pt, and Pd are commercially available. Some of the chemicals have been tested in dry resistors for the detection of VOCs and gases (Table 2).

TABLE 2

Examples of tested MPcs and MPPs for gas sensors.

| MPc/MPP | Detection of | Ref |
| --- | --- | --- |
| CuPc | $NH_3$ | [42, 43] |
| CuPP | Benzene | [51] |
| PtPP | $CO_2$ | [52] |
| ZnPc | Acetone | [53] |
| LuPc | Ethanol | [54] |
| CoPP | Methanol | [55] |

The electrochemical responses to the target chemicals, specifically with mucus electrolytes, have not previously been studied. The e-nose detection system is based, in certain embodiments, on the particular MPcs and the sensitivity and specificity of the detection for the targeted VOCs and gases in FIG. 7 that are identified to be the signature chemicals in human breath for diagnosing various diseases [32, 39]. Certain embodiments also or additionally reflect the molecular structure of the organometallic compounds MPcs, MPPs, and derivatives of those when exposed to different radicals. As such, the e-nose reflects the most beneficial combination of the metal ion and the molecular structure of the compounds as it relates to the sensitivity and selectivity to the different VOCs and gases. In a preferred embodiment seven organometallic compounds, each with the highest sensitivity and specificity to one of the seven target chemicals are used in a sensor having an array of ECTs.

Considering that the interaction between the VOC/gas and MPc is through the Lewis acid-base bond, the energy level at the lowest unoccupied molecular orbital (LUMO) of the MPc (acting as the Lewis acid) and the highest occupied molecular orbital (HOMO) of the target chemical may be considered for the selection of the ion in the Pc structures [56]. For instance, the strong response of CuPc to $NH_3$ is believed to be due to energy matching between LUMO of CuPc and HOMO of $NH_3$ [43]. Organometallic compounds may be identified so that their LUMO matches the HOMO of one of the seven targeted chemicals.

Two types of sensors are contemplated: a) resistive sensors and b) 3-electrode electrochemical sensors. The resistive sensors may be fabricated similar to the device shown in FIG. 5. Gold or copper electrodes may be sputtered on a cellulose substrate (i.e., paper) using a shadow mask. Using appropriate solvents, a solution of an MPc can be made and used as ink for drop casting the solution between the two electrodes for making the sensors [57]. Devices may be made with Pc (no core metal) and MPcs with different metal ions. The sensors operate in a dry form when being exposed to a stream of gas (the setup in FIG. 8) containing all seven identified matching VOC/gas. The I-V characteristics and the pulse response of the sensor may then be measured when the sensor is exposed to different chemicals. The same devices may then be operated when the cellulose structure is wet with the most effective mucus electrolyte found in objective 1. The I-V and the pulse results show the sensitivity and the response time of each MPc to all the tested VOCs and gases with the electrolyte. Also, the effect of the mucus on the responses can be identified. Comparing the results with the Pc sensor without any metal ion reveals the role of different metals in the detection process.

A three electrode configuration may be used to understand the interaction between MPcs and the target chemicals affects the redox and state of the metal ion in the electrochemical sensors. Carbon or Pt planar electrochemical electrodes with a Pt counter and a silver reference electrode all on a cellulose substrate are commercially available (FIG. 6.a). In one embodiment the working electrode can be coated with a thin layer (0.1-1 µm) of Pc or MPc. CV and EIS results may be measured. With various MPcs being exposed to different VOCs and gas molecules and examining the redox behavior of the organometallic compound. Specifically, the CV studies can be used to identify the redox peaks. The effect of the chemicals on the redox behavior (i.e., redox potential and anodic/cathodic current amplitude) provides informative data. The strength of the redox signals on both CV and EIS indicates the sensitivity and selectivity of the MPcs in response to various chemicals at different concentrations.

Since the Lewis acid-base bond occurs between the metal in the organometallic compound and the target chemical, it is expected that if a metal ion in an MPc structure presents high sensitivity to a particular VOC/gas molecule, the same metal ion in an MPP structure would respond to the same target chemical. To achieve the highest level of selectivity, the molecular structure of the organometallic compound may be important. Specifically, the effect of the molecular structure on the LUMO level of the Lewis acid may be important.

Pcs and PPs both belong to a larger group of chemicals called Π-macrocycle materials [20]. In one embodiment both the resistive and electrochemical sensors are fabricated from only MPPs. In other embodiments one or both sensors may be made from derivative of MPPs. In one embodiment, MPP compounds are provided, optionally with a core metal in MPcs having high sensitivity and specificity to one of the target VOCs or gases. In further embodiment, derivatives of the chemicals (MPc/MPP with different moieties) may be used, depending on the highest sensitivity and selectivity relative to the target VOCs or gases.

Figure 12:
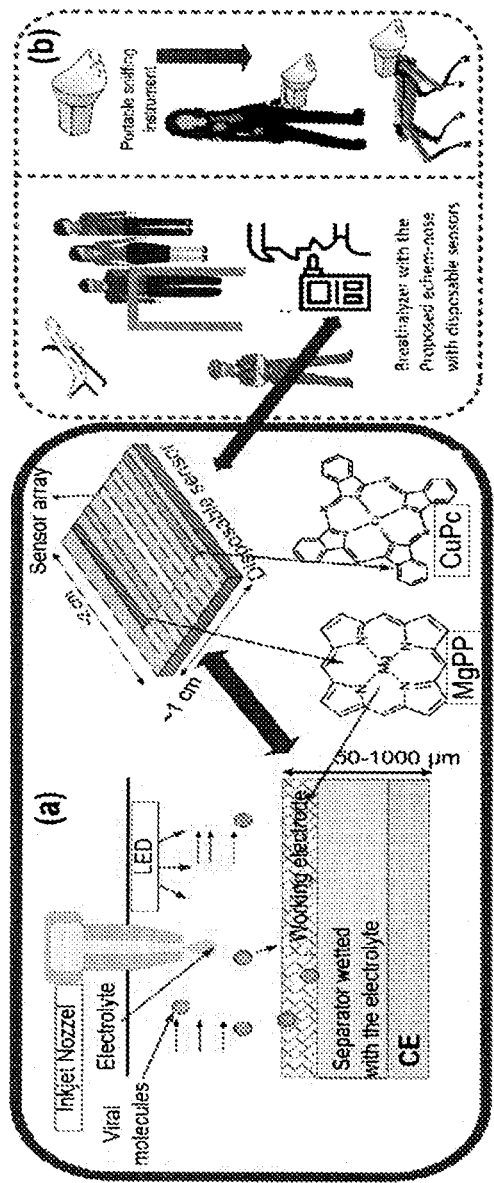

Light may also have an effect on the strength of the signal. Strong photoreactivity has been reported from various MPcs and MPPs when they were used as a dye in dye-sensitized solar cells [58, 59]. Due to the multiple energy levels associated with the metal core, MPcs and MPPs can absorb photons at different wavelengths. The absorption of photons can generate excited electrons in the molecular orbital of the organometallic compound which in turn enhances their redox reactivity. Hence, in certain embodiment, it might be possible to detect stronger signals (and achieve higher sensitivity) if the electrochemical detection of target chemicals would be conducted when the organometallic compound is under white light illumination. Certain embodiments may include a light source, to apply light, for instance, light-emitting diodes (LEDs) for more accurate measurements of the target chemicals. FIG. 12 depicts an embodiment similar to that of FIG. 1, but with an LED light source.

FIG. 12 also shows the sensor with a working electrode (a first electrode), a porous separator wetted with electrolyte and a second electrode or counter electrode which may be a platinum or carbon electrode (CE). The separator may be paper or membrane or some other suitable porous liquid absorbing material. Also shown are an inkjet nozzle to deliver electrolyte.

Figure 13:
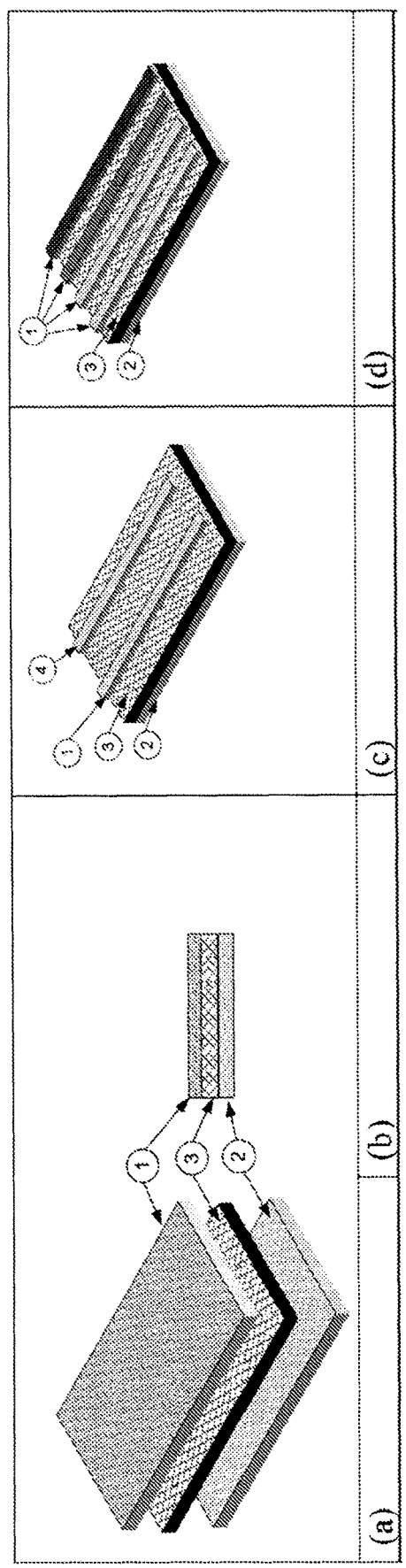

As shown in FIGS. 13a and 13b, a separator 3, sits between a working electrode 1 and a counter electrode 2. FIG. 13c shows a reference electrode 4 adjacent a working electrode 1. FIG. 13d shows a plurality of working electrodes 1, the separator 3, and counter electrode 2 as might be used, for instance, in an electrode array.

Considering the flat molecular structure of MPcs and MPPs, in a thin film structure, the molecules can stack on top of each other and produce a strong II-II stacking. In thin-film and dry MPc/MPP gas sensors, losing II-II stacking bond after interaction with viral molecules is reported [20]. The structure of thin films (dry) of different organometallic compounds may be investigated with X-ray diffraction (XRD) and Raman Spectroscopy before and after being exposed to the target chemicals. Variation in their characteristics will indicate the effect of the interaction of the test chemicals on the arrangement of the molecules and the nature of the bond or interaction between metal ions and the chemicals.

Ideally, seven different organometallic compounds each being sensitive to only one of the chemicals from the human breath (high selectivity) are used in an array. Although the redox property of chemicals can be a signature to identify specific VOCs/gases, the selectivity of MPcs and MPPs can be limited. Hence, practically, it is preferred to provide MPcs and MPPs with a high sensitivity to a specific chemical and lower sensitivities to other chemicals. Data from signals from different sensors may be processed through a computer algorithm and processing for accurate detection and measurement of chemicals in human breath. For instance, if one compound generates a distinguished EIS signal and another one shows a unique feature in its I-V characteristic, the sensor array will be designed to read the EIS signal from the first one and I-V data from the second one. Further, the strength of a signal may depend on the thickness of the MPc/MPP layer. An optimum thickness may be determined for each of the individual MPc/MPPs or they may all be provided uniform thickness.

Considering the role of the AI/ML algorithm to take in and analyze sensor data to detect and identify gases/VOCs and their concentration for a wide range of gases/VOCs based on their unique chemical signatures, a combination of statistical and ML techniques is proposed. One approach is to use multivariate statistical analysis, such as principal component analysis (PCA, to reduce the dimensionality of the data and identify the underlying patterns and relationships), linear discriminant analysis (LDA, to find the linear combination of features that maximally separates different classes of gases or vapors), multi-way analysis (MFA, to analyze the relationships between multiple variables and identify patterns in the data), or partial least squares (PLS, to identify patterns in the data and to reduce the dimensionality of the data). This can help to identify which materials are most sensitive to certain gases or VOCs and to determine the concentration of these gases or VOCs in the environment. Another approach is to use ML algorithms, such as support vector machines (SVMs) or artificial neural networks (ANNs) to analyze the data and classify it into different categories based on the type of gas detected. These algorithms can be trained on a dataset of echem-nose readings and corresponding gas or VOC concentrations to learn how to predict the type and concentration of gases or VOCs in a sample. The overall results of these experiments can then be used to measure and compare the sensitivity of different MPcs/MPPs to particular chemicals.

Figure 14:
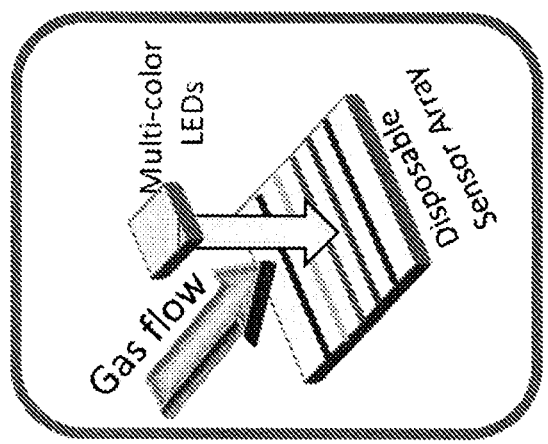

In a preferred embodiment, an array of sensors with different organometallic compounds for concurrent detection of various chemicals from human breath is used for the e-nose breathalyzer, as shown in FIG. 14.

FIG. 15 depicts features of an embodiment similar to FIG. 1, adding an inkjet nozzle with a reservoir, a nozzle controller, a heating and/or cooling stage, an LED light source, a sensor chamber, and an electronic circuit to read electrochemical signals from the sensor or sensor array.

Figures 10A, 10B, 10C:
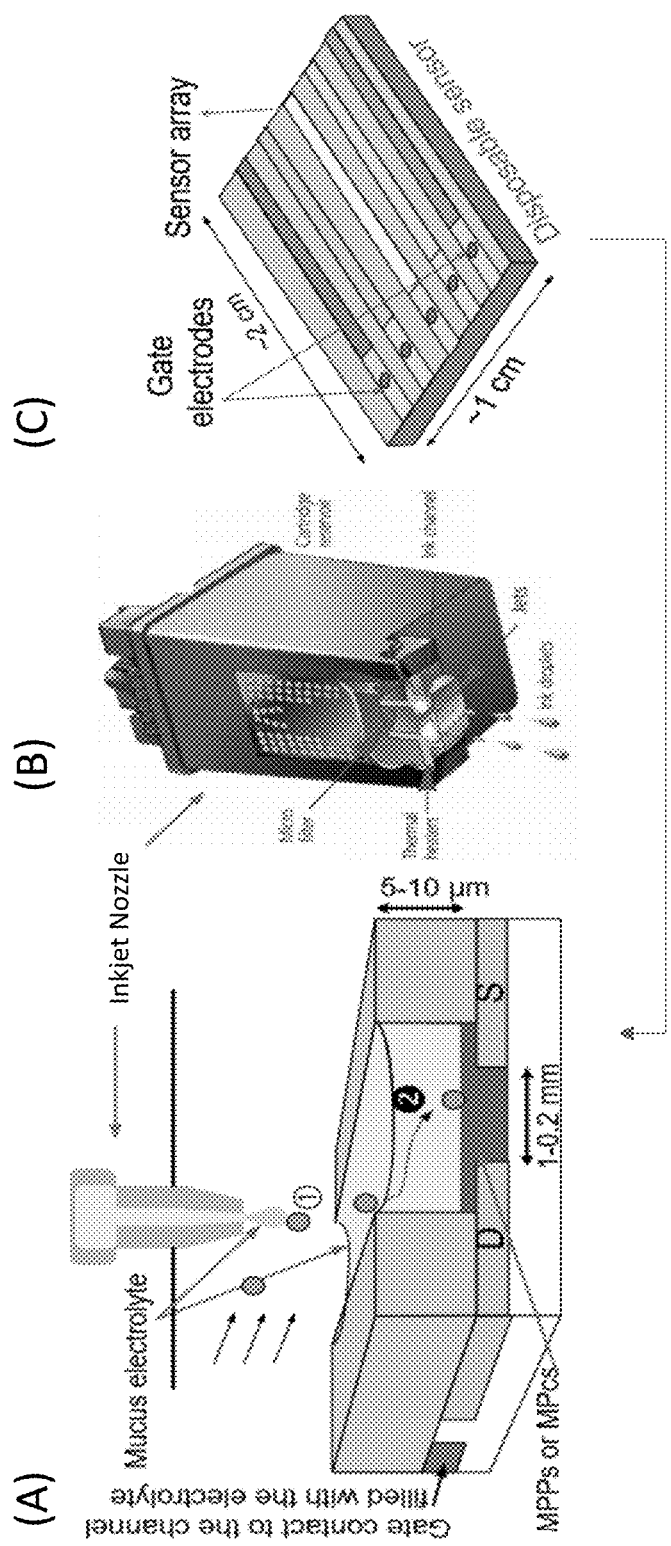
Figure 11:
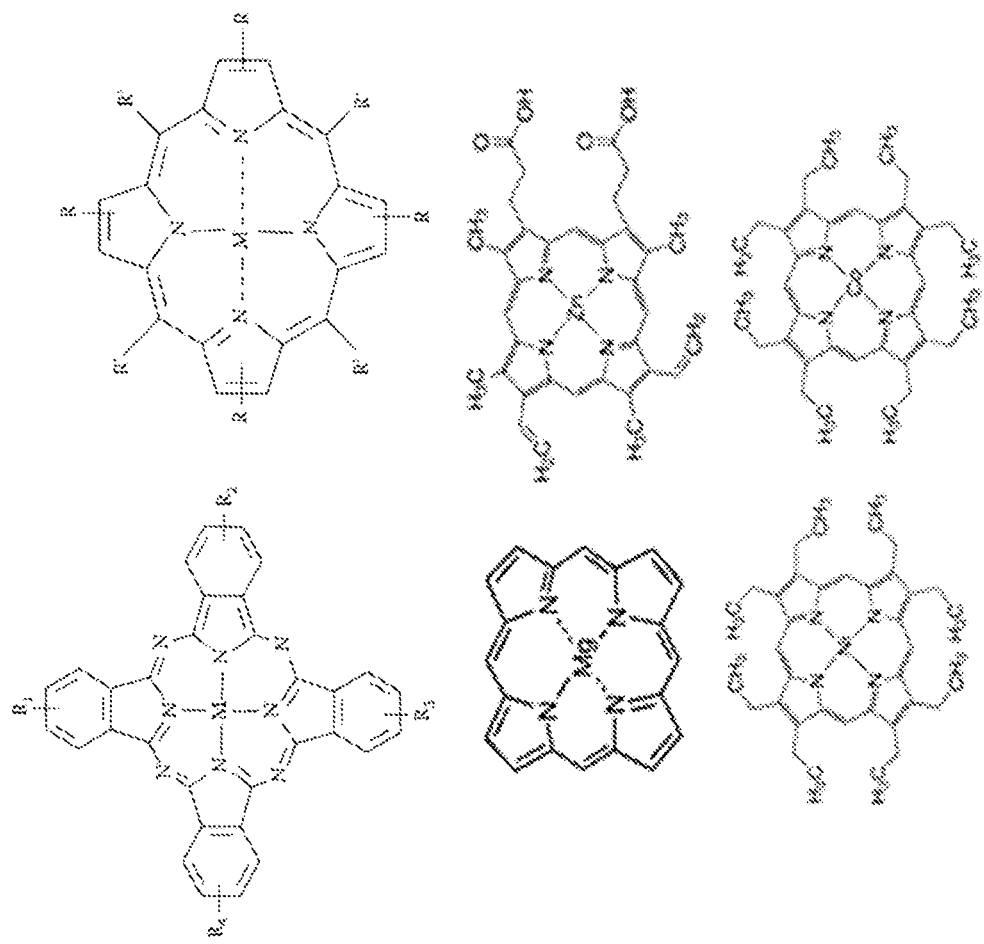

Compared to a two-terminal device, such as a resistor, a transistor design has the advantage of being able to amplify signals via biasing the gate terminal. A practical design of electrochemical transistors for disposable sensors includes an organic material sensitive to the target chemical as the conductive channel between the drain and source terminals. The gate terminal can be a reference electrode (e.g., Ag/AgCl) being in touch with the electrolyte that covers the organic material (see FIG. 6.d). Application of a sufficiently large voltage difference between gate and source can change the oxidation state of the organic material and modulate the current that flows between drain and source. Applying organometallic compounds as the synthetic chemoreceptors, a transistor design with sufficiently large gate voltage can enhance the redox reaction between MPc/MPP and the target chemicals being trapped in the mucus electrolyte. Hence, an amplified detection signal can be generated to achieve higher sensitivity in the device. As shown in FIG. 10A, an embodiment similar to FIG. 1 includes an electrochemical transistor with a side reference electrode as the gate contact surrounded by short walls (height=5–10 μm) to hold the electrolyte. Preferably the organometallic layer is of a thickness to optimize the highest drain current on/off ratio. A high ratio can present the ability of amplifying the chemical sensor. A nozzle can be provided by an inkjet cartridge as shown in FIG. 10B. As can be seen in FIG. 1b and FIG. 10C, the gate contact of each ECT in the disposable sensor is in the same channel covered by the electrolyte.

Devices may be fabricated by patterning the electrodes (Ag for gate and Au or Cu for drain and source) on a substrate and building the pool around the transistor area using shadow masking and conventional lithography methods. A thin layer of the desired MPc/MPP with appropriate thickness will be applied (e.g., drop casting) at the space between drain and source. (FIG. 6). Devices may be tested at different biases to obtain ID-VDs curves at various VGs voltages. Device functionality may be tested under $N_2$ flow with a mucus electrolyte. Then the effect of the target chemical on ID-VDs may be studied at different VGS bias voltages.

In another embodiment, to mimic the effect of cilia in the olfactory epithelium for holding a thin electrolyte layer over the receptors, porous electrodes will be fabricated by coating strips of paper with a layer of MPc/MPP and then using the capillary action to wet them with the mucus or mucus-like electrolyte.

Figure 18:
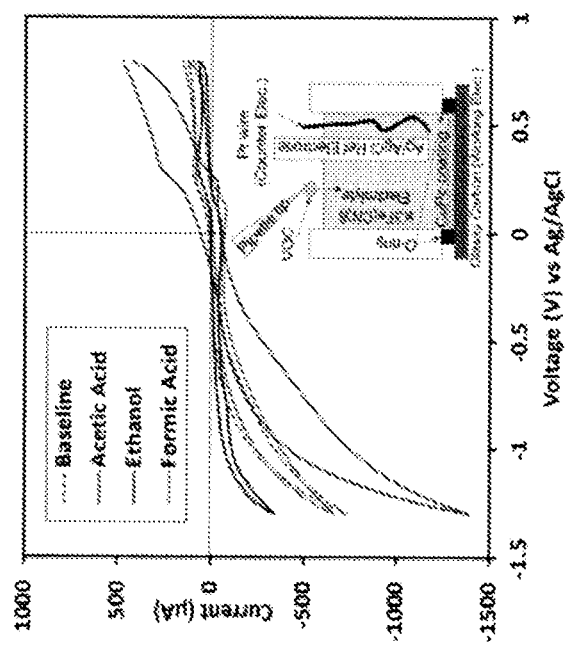

Referring to FIG. 18, a solution of an MPc was made and used as ink for drop casting on a glassy carbon electrode. A buffer solution (0.05 M $K_3Fe(CN)_6$) was used as the electrolyte. First, CV was conducted to identify the redox peaks. Since VOCs are naturally in liquid form, the target chemicals can be directly added to the electrolyte. Repeating the CV experiments for each of the target VOCs, the effect of the target chemicals on the redox peaks was studied as an indicator. Similarly, electrochemical impedance spectroscopy (EIS) and chronoamperometry (CA) methods was applied before and after introducing the target chemicals. Variations in the impedance or electrochemical current may be recorded as sensing signals. Particularly, the EIS experiment reveals the conductivity change in the MPc layer. Experiments may be repeated for working electrodes being coated with different MPcs (at least 7 different MPcs potentially suitable for 7 VOCs and gases) and also with Pc. Comparing the results from the Pc and MPcs will reveal the effect of the metal ion core on the selectivity of MPcs. Also, by controlling the concentration of added VOCs, the sensitivity of each compound to the target VOCs can be measured from the CA results. Additionally, using UV-Vis and Raman spectroscopy, the effect of exposing MPcs to each of the VOCs/gases will be studied separately for gaining a better understanding of the interactions between the receptor and the analyte.

Figure 19:
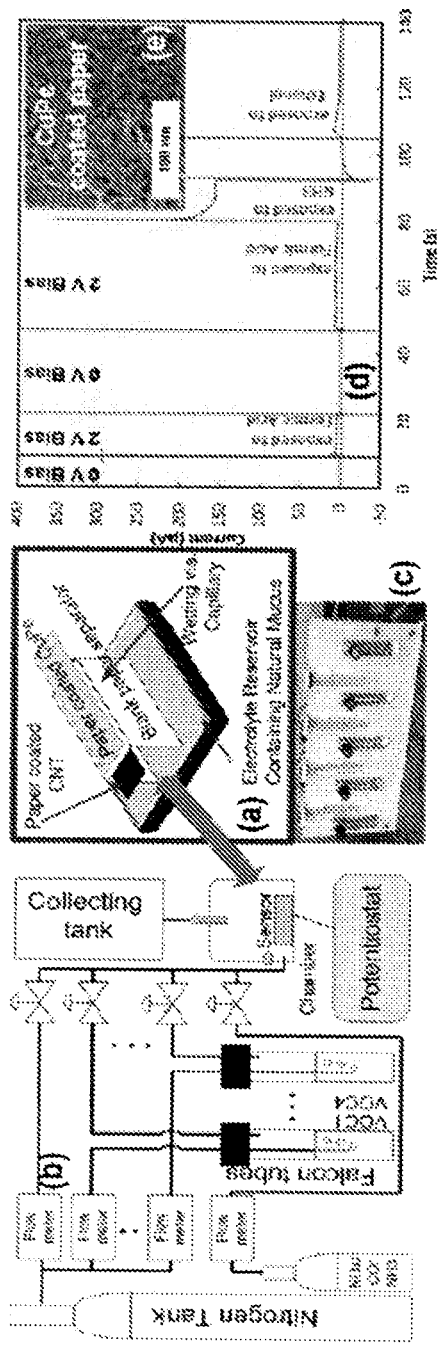

Referring to FIG. 19, a two-terminal electrochemical cell was designed with paper-based electrodes and a separator (FIG. 19a). The top electrode was made by casting a solution of CuPc as the active material on a strip of paper (FIG. 19.e). Using an in-house recipe [76], carbon nanotube (CNT) ink was prepared and cast on another piece of paper to be used as the counter electrode. A blank paper was placed between the two electrodes and was extended to a reservoir containing diluted natural mucus from humans (sample from lee-bio.com) as the electrolyte. Due to the capillary action, the separator and the surface of both electrodes became wet with a thin layer of the mucus electrolyte standing over the electrode surface. As shown in FIG. 19.b&c, a simple mist-generating system similar to the one used by Saito et al. [77] has been designed and used for testing the sensor being exposed to various VOCs and gases. The nitrogen tank supplies the main gas stream that can be mixed at a desired ratio with other gases (CO/NO/$NH_3$) by controlling the flow rates of each line. To insert VOCs, the nitrogen stream is bubbled into VOCs in the falcon tubes. To calibrate the ppm of the inserted VOCs, the amount of consumed VOC in the falcon tube is considered with respect to the volume of nitrogen gas being fed into the chamber in a period of time. The collecting tank ensures the safety of the experiments by protecting the lab environment against the released chemicals. FIG. 19.d shows the chronoamperometry (CA) response of the echem sensor when exposed to formic acid, ethanol, and $NH_3$. The strong response to $NH_3$ is consistent with the previous results from CuPc tested in a dry sensor. The results confirm: 1) the feasibility of using paper-based sensors for wetting the surface of the active electrode with a thin electrolyte layer, and 2) the practical approach of harnessing viral chemicals using mucus electrolytes.

Porosity of electrodes may be a factor to consider in certain embodiments. To control the volume of the absorbed electrolyte, we will test the response of the sensors made on different paper substrates. As the SEM image in FIG. 19.e shows, the organometallic compound coats the fibers of the paper and leaves voids that can be filled with the electrolyte when the electrode gets wet. Substrates with larger pores can accommodate more liquids. Also, the average thickness of the liquid layer that covers the fibers of the paper is a function of the pore sizes and pore densities. In this task, we will use filter papers with controlled pore sizes and defined pore densities. Commercial filter papers with average pore sizes from 1-20 μm are available. Since CuPc has already shown sensitivity to ammonia and formic acid, we will focus on studying the effect of the electrode porosity using CuPc. Strips of filter papers will be coated with a layer of CuPc by drop casting a solution of the MPc.

In addition to synthetic or natural mucus, $K_3[Fe(CN)_6]$ may be used an an electrolyte. Potassium ferricyanide may serve as a redox material. OBPs, and in particular insect OBPs with their high chemical stability, are compatible with the $K_3[Fe(CN)_6]$ electrolyte, and are able to detect various VOCs. Particularly, OBPs from honeybees (*Apis cerana*) are of interest and may be added to the electrolyte, such as Apis-OBP to the electrolyte. Aqueous based $K_3[Fe(CN)_6]$ electrolytes with different concentrations (0.05-0.5 mM) of Apis-OBP may be used.

Figure 20:
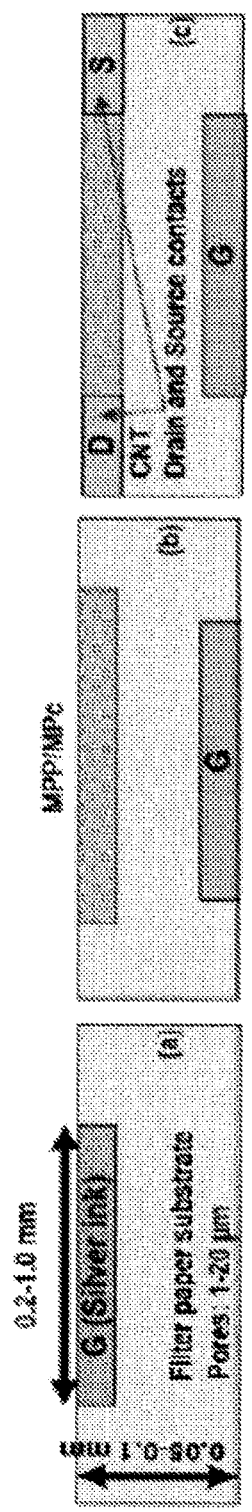

Referring to FIG. 20, a paper based ECT design is shown, preferably using both sides of the paper. Using Ag ink, a gate contact patterned at the backside while a strip (0.2-1 mm wide=transistor channel length, ~2 cm long=transistor channel width) of the selected MPc/MPP is printed on the front side using a masking technique. CNT ink may be applied across the strip to form the drain and source contacts. To avoid short circuits between the back and front contacts, the volume of applied inks is preferably be controlled. Cross-sectional SEM images will be taken to estimate the depth of the active layer and ensure no short circuit through the paper thickness. A capillary effect is employed to wet the ECT with a mucus or mucus-like electrolyte (e.g., OBP+electrolyte) in a reservoir. Then, using a two-channel source-measure unit, SMU (Keithley 2602), ECTs are tested at different biases to obtain ID-VDS curves at various VGS voltages.

Figure 17:
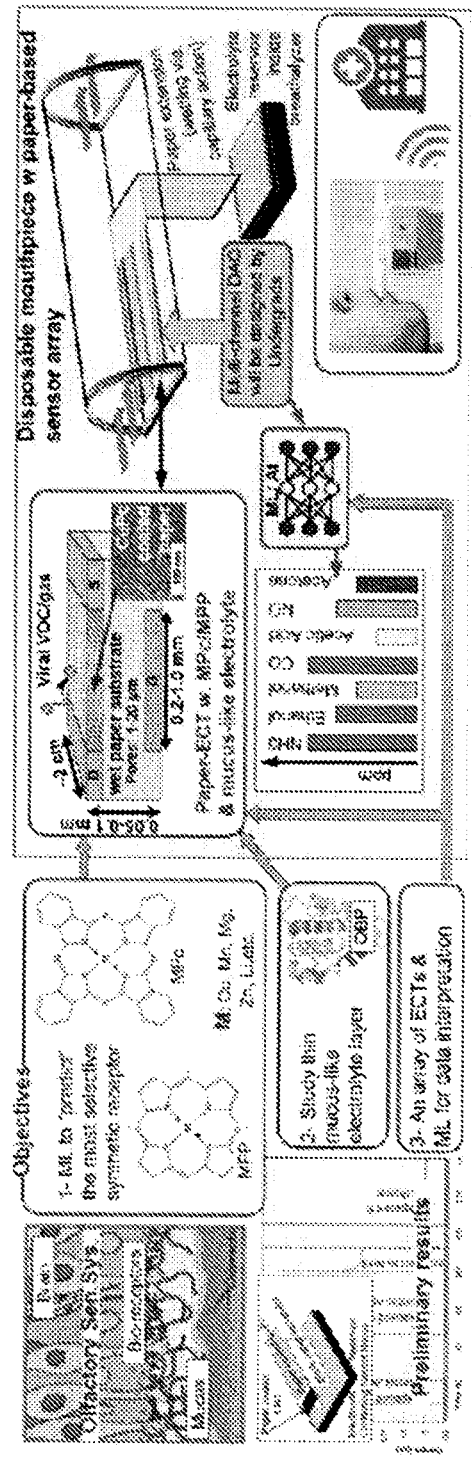

An electronic interface may be provided as a microcontroller-based system that can be programmed for applying different biasing voltages to different ECTs to achieve the highest sensitivity in each sensor. A 3D printed enclosure will be designed to accommodate the electronic circuit. Configuring the breathalyzer with a disposable sensor array will include the electrolyte reservoir. A mechanism so that once the disposable sensor array is inserted into the breathalyzer, a small amount of electrolyte is released to wet the sensor for the measurement. With such a mechanism, the electrolyte would be stored in the reservoir and can be used once the user loads the device with a fresh sensor array. After breathing into the device, the paper-based sensor can be disposed with the mouthpiece designed for only one-time usage (FIG. 17). However, the breathalyzer circuit including the stored mucus like electrolyte in the reservoir can be used multiple times.

An AI/ML algorithm may be used to read the signals from various sensors each with different sensitivity to different viral chemicals, and analyze their responses. Training the algorithm through controlled experimental conditions when a mixture of different VOCs and gases is inserted into the chamber can result in a relatively accurate assessment of the breath composition when the device is used as a breathalyzer. The selected MPcs and MPPs are expected to have much higher selectivity than the current MOX sensors in the e-nose devices. Hence, the echem-nose is expected to be more reliable than MOX e-noses for medical applications and diagnostics.

For instance, a supervised ML with classification may be applied by labeling the signals from each sensor when they are exposed to a single VOC/gas with a known concentration in the testing chamber. It is only through an accurate AI/ML model that MPcs/MPPs with high sensitivity to particular chemicals can be identified. The accuracy of echem-nose data analysis can be improved by using a large and diverse dataset for training and by using advanced AI/ML techniques such as deep learning. It is also important to carefully calibrate and maintain the echem-nose sensors to ensure that they are functioning properly and providing accurate readings. Overall, the analysis of electronic nose data involves the use of various statistical and machine learning techniques to classify and identify gases and vapors, as well as to determine their concentration. The results from the ML modeling may define the type and concentration of each of the target VOCs/gases when the sensor array is exposed to a gas mixture. These techniques can be applied to a wide range of applications, including environmental monitoring, food safety and quality, and medical diagnosis.

An effective method of dissolving a gas into a liquid is to use a vessel with high-pressure gas on top of the liquid. The pressurized gas increases the rate of adsorption of particles/molecules into the liquid and results in a higher concentration of the dissolved gas in the solution. Although some gas sensors have employed this mechanism [36], the detection of viral chemicals at ambient/low positive pressure requires a different approach. In the olfactory system, the moist environment in the nasal cavity assists in capturing the particles and molecules by the mucus layer on the nasal receptors. Bowman's gland in the olfactory epithelium generates the mucus layer and mists the air in the nasal cavity. To mimic this moist environment, the sensing system of the present disclosure utilizes an inkjet nozzle (or other suitable delivery device) on top of the sensor to drop mucus repeatedly, continually or even constantly into the electrolyte pool. Also, considering that a thin electrolyte layer evaporates at room temperature in a relatively short period of time (a few minutes), the constant drip of mucus from the nozzle can compensate for the electrolyte evaporative loss. A microcontroller-based system may control the dispensing rate of the liquid.

On average, a droplet of an inkjet nozzle in a printer has a volume of 2-4 picoliters. Based on the suggested dimension of the microchannel (length of ~2 cm, width of ~0.2 mm, and height of ~10 µm), the electrolyte volume on top of the transistor is estimated to be at least 400 nanoliters. The exact volume will be determined after the completion of the simulation in Task 3.1. Nevertheless, the ratio between the two volumes (picoliters vs sub microliters) suggests a relatively fast rate of electrolyte dispensation, which in turn can enhance the precipitation of the viral agents. Preferably the device will operate at the most effective drop rate, at the ideal distance between the nozzle and sensor on the LOD, and ensure the highest sensitivity of the sensors.

In animals, a constant release of mucus is critical for maintaining a fresh mucus layer. Preferably, the echem-nose is equipped with a microfluidic system to remove the old mucus layer and allow a fresh electrolyte layer positioned between the receptors and viral chemicals. Considering the application of the echem-nose as a disposable sensor, for each time of use, also, a new electrode will be inserted in the breathalyzer and after the measurement, the sensor will be disposed.

Human thermoregulation keeps the body temperature around 37° C. Considering the mechanisms of capture and detection of odorants in the olfactory system, it is expected that temperature has a direct impact on the sensing smells. In some vacuum systems, a cold trap is used to reduce the kinetic energy of gases or viral particles to facilitate the capture process [60]. On the other hand, high temperatures accelerate diffusion inside a liquid media and maintain the mist in the nasal cavity. Hence, an optimum temperature is expected for efficient capture and diffusion in the proposed sensing device. Preferably the temperature and temperature control system will be designed for a range from 4° C. to 40° C. This will allow the device to operate at an optimum temperature for the efficient capture and detection of viral chemicals.

In a preferred embodiment, a compact and portable breathalyzer is provided along with disposable sensors for measuring chemicals from human breath. The disposable sensors may include an array of detectors, one or more of the detectors being configured to detect one or more distinct gases or other chemicals. The disposable sensors may be discarded after use and a new unused disposable sensor may be used with the breathalyzer.

In one embodiment the device includes a sensor with at least one first electrode and a second electrode. A liquid electrolyte having a predetermined amount of at least an amount of a natural mucus and/or a synthetic mucus may be provided. A separator with a porous member configured to hold the liquid electrolyte and wet the surface of the first electrode and wet the surface of the second electrode with the liquid electrolyte may be provided. The first electrode may be made from a metallophthalocyanine or a metalloporphyrin or a derivative thereof or the first electrode may be in electrical contact with a metallophthalocyanine or a metalloporphyrin or a derivative thereof. The metal in the metallophthalocyanine or metalloporphyrin or derivative may selected from the group consisting of Cu, Zn, Co, Mg, Mn, Fe, Pt, and Pd. The second electrode may be an ideally polarized electrode made from non-redox active materials. The second electrode may be a platinum or carbon electrode.

The sensor may also include an electrolyte storage container and a mechanism to provide the liquid electrolyte to the porous member. The mechanism to provide the liquid electrolyte to the porous member may be a dropper, a nozzle, an inkjet nozzle, or microfluid delivery component.

The sensor may also include a reference electrode. In a preferred embodiment, the sensor may include a plurality of first electrodes. A light source may also be provided to illuminate the electrodes. The light source may be an LED light.

A computer processor and a meter in electrical communication with the first sensor and the second sensor, may be provided. Preferably the meter is configured to measure electrical resistance across the first sensor and the second sensor.

In one embodiment the first electrode, second electrode, and separator are arranged in a stacked layer configuration with the separator between the first electrode and the second electrode.

In one embodiment the first electrode, second electrode, and separator are arranged with the first electrode and the second electrode being printed on opposite sides of the separator.

In one embodiment the first electrode and the reference electrode are arranged on one side of the separator and the second electrode is arranged on the opposite side of the separator.

In one embodiment first electrodes are arranged on one side of the separator and the second electrode is arranged on the opposite side of the separator.

In one embodiment, the electrodes are housed in a chamber or passage and configured to direct a gas to be tested across the surface of the first electrode.

In one embodiment, the sensor is configured to detect a measurement of an electrochemical reaction occurring at the first electrode. In one embodiment, the sensor is configured to detect a measurement of an electrochemical change occurring at the first electrode. In one embodiment, the sensor is configured to perform one or more detection measurements based on one or detection forms selected from the group consisting of cyclic voltammetry, chronoamperometry, and electrochemical impedance spectroscopy.

The sensor may also include a heating or a cooling stage and a temperature sensor operably connected to the heating or the cooling stage to allow the heating or the cooling stage to maintain a predetermined temperature.

In another embodiment a method is provided for detecting a chemical property of a gas, the method involves at least the steps of: directing the gas to a sensor having at least one first electrode and a second electrode along with a liquid electrolyte having a predetermined amount of at least an amount of a natural mucus and/or a synthetic mucus and a separator with a porous member configured to hold the liquid electrolyte and wet the surface of the first electrode and wet the surface of the second electrode with the liquid electrolyte may be provided. In this way, some of the molecules of the gas may be captured by the electrolyte and some of the molecules of the gas may then interact with the first electrode. A second step of the method involves detecting or measuring an electrochemical change at the first electrode.

EXAMPLES

Electrode fabrication Porous electrodes were made by coating multi-walled CNT ink on printing papers. The ink was prepared by adding 300 mg MW-CNT with 150 mg SDBS in 30 mL deionized water. To obtain a homogeneous solution by agitating the nanoparticles, the ink was then placed inside a probe sonicator for 35 minutes, with an average power set at 35 W and energy at 40 J. Small pieces (4 cm×7 cm) of paper were cut out of the regular printing paper, and 1 mL of the CNT ink was spread on both sides. After that, the CNT coated paper strips were put inside a vacuum furnace, and heated for 30 minutes at 120° C. This process was repeated three times to make sure that the ink was uniformly applied to the paper sections. After parching them completely, smaller pieces of dimensions 4 cm×1.5 cm were cut out, which were used as the porous electrodes. For making the working electrodes (WE), 30 μL of metalated phthalocyanines (Co, Cu, Mg, and Zn) were drop-casted on both sides of the CNT coated strips, three times in total, 10 minutes apart. The bare CNT coated pieces were used as the counter electrodes (CE).

Electrolyte preparation For this experiment, a polar electrolyte was considered for establishing reliable electrical connection between the working and the counter electrodes. 1 M NaCl solution was prepared and used as the polar electrolyte. The porousmembrane paper separator was designed such a way that it can draw the electrolyte through capillary action from two reservoirs underneath.

Phthalocyanine solution preparation Depending on the central metal core, MPcs have different solubility properties in different solvents. Based on the maximum concentration of each Mpc, and their respective Q-band absorption spectra10 appropriate solvents for each MPc was selected. In all four cases of the four phthalocyanines that we worked on here, 3.5 mM MPc solution was prepared. For CuPc and CoPc, trifluoroacetic acid (C2HCL3O2) was used as the solvent. For MgPc and ZnPc, the solvents tetrahydrofuran ((CH2)4), and formic acid (HCOOH) were used respectively.

Figure 21:
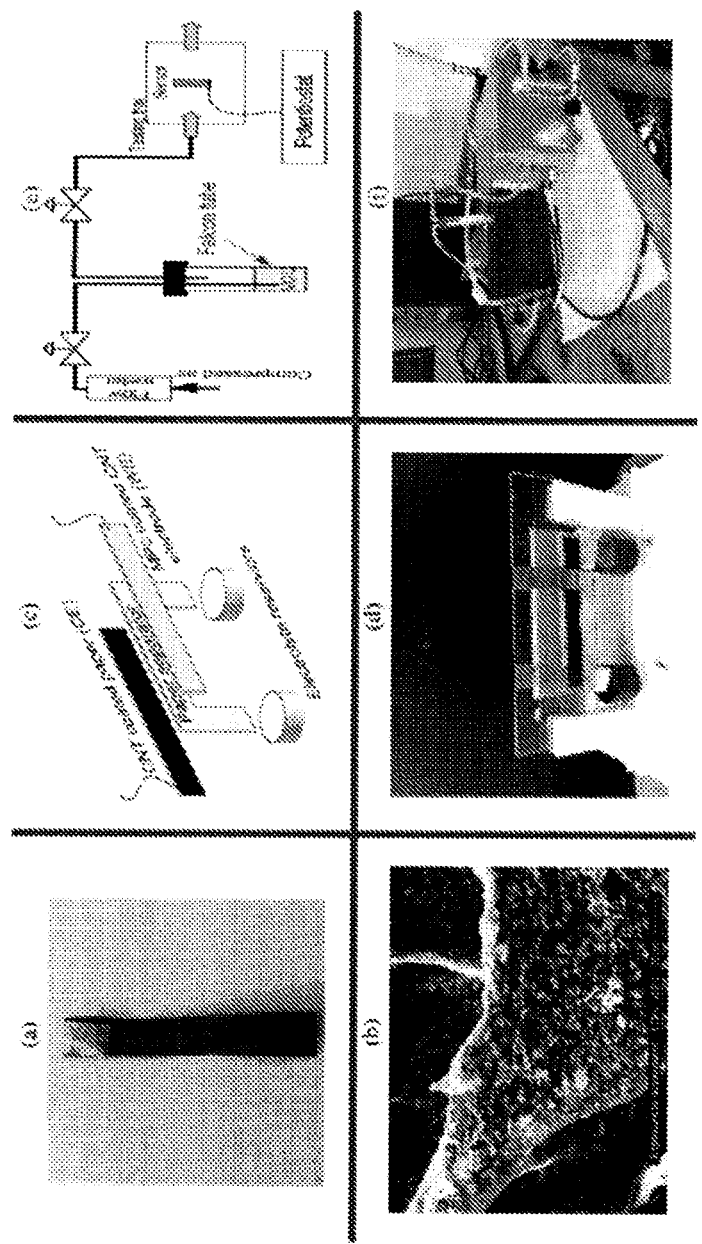

The test setup The sensing devices with the reservoirs were placed inside a sealed box. VOC analytes were kept externally in four different falcon tubes and using the compressed air flow, the VOCs were then driven inside the box. The air flow was monitored and controlled using a flow meter. FIG. 21 illustrates the test setup and the fabrication of the devices.

Figure 22:
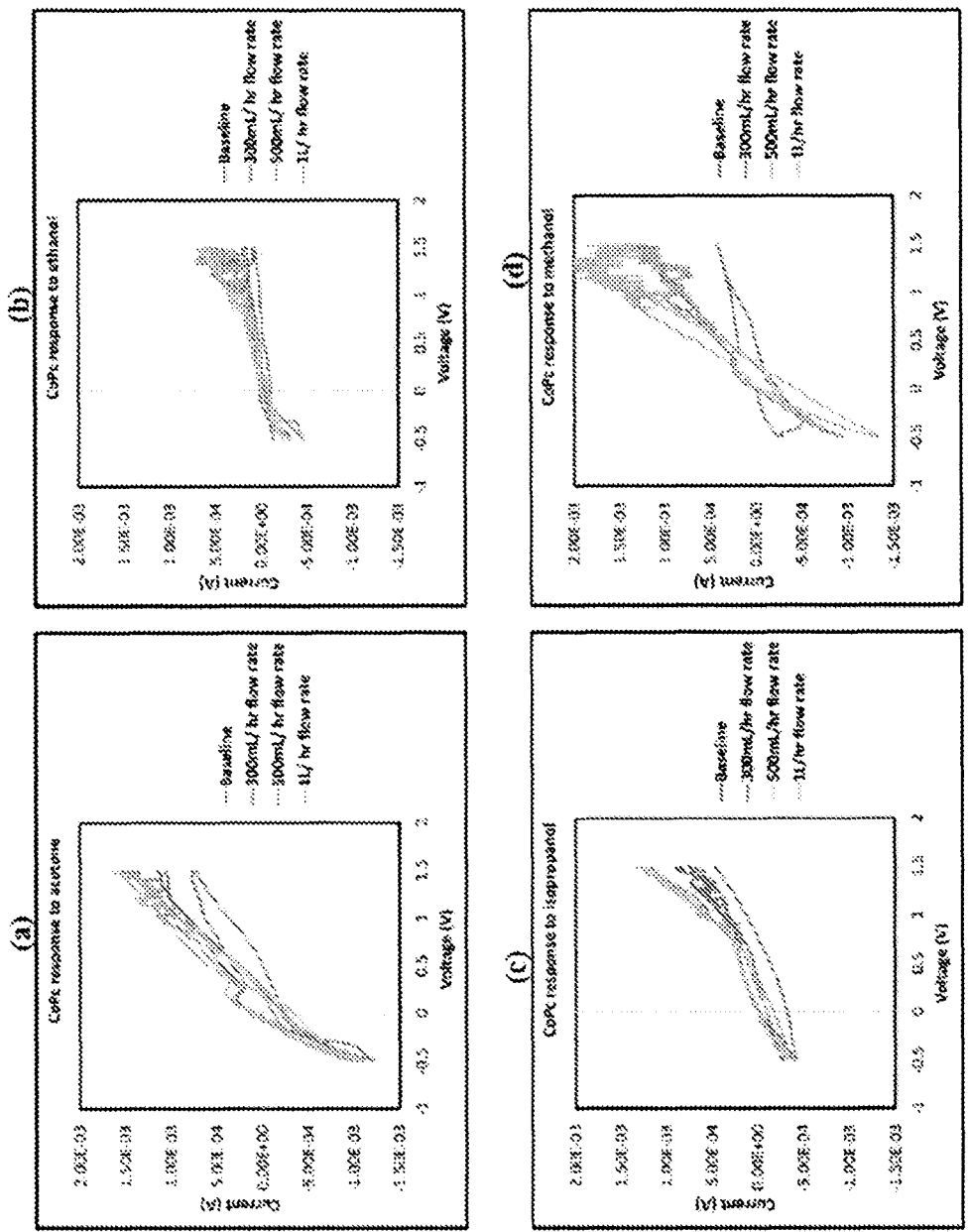

Results And Discussion CV measurements were performed using the versaSTAT 4 potentiostat, with a potential range between −0.5 V to +1.5 V at 50 mV/s scan rate. FIG. 22 shows the CV response of the sensor with the CoPc coating. Under four different conditions the tests were performed: (a) baseline (before exposure to analytes)-represented by the blue lines, (b) exposure to analyte at 300 mL/hr flow rate-represented by brown lines, (c) exposure to analyte at 500 mL/hr flow rate represented by gray lines, and finally (d) exposure to analyte at 1 L/hr flow rate-represented by yellow lines. We also observed the oxidation and reduction peaks. However, the CV responses were different to different analytes and different flow rates.

FIG. 22 shows CoPc response in terms of cyclic voltammetry to (a) acetone, (b) ethanol, (c) isopropanol, and (d) methanol. The cyclic voltammetry curves clearly show peaks when scanned anodically (i.e., the forward scan). This indicate that oxidation of the MPc coated electrodes is occurring, and thus, the anodic current also increases in all the cases. The trend is observed in the rest of the three MPcs considered for this experiment (CuPc, MgPc, and ZnPc) (the curves are not shown here).

Figure 23:
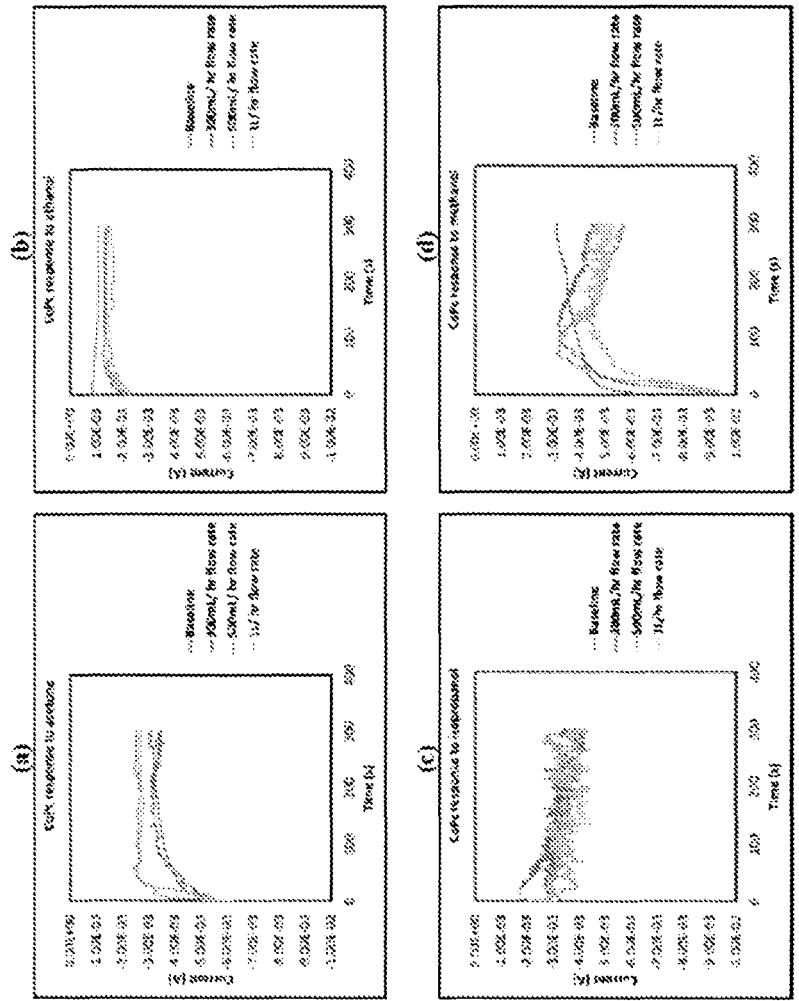

Referring to FIG. 23, FIG. 3: CoPc response is shown in terms of chronoamperometry to (a) acetone, (b) ethanol, (c) isopropanol, and (d) methanol. Chronoamperometry tests were performed at −2 V constant potential for 300 s after exposure to each of the analytes. As shown in FIG. 23, for the sensor with CoPc, interestingly, while exposure to ethanol, isopropanol, and methanol led to an increased level of conductivity, the results from exposure to acetone suggest otherwise; with increasing flow rate a trend in decrease of the conductivity was observed. It should be noted that exposure to methanol led to an increase in conductivity by one order of magnitude. The zagged lines in the data in FIG. 23 are likely to be the effect of the capillary action that kept the porous membrane wet.

Figure 24:
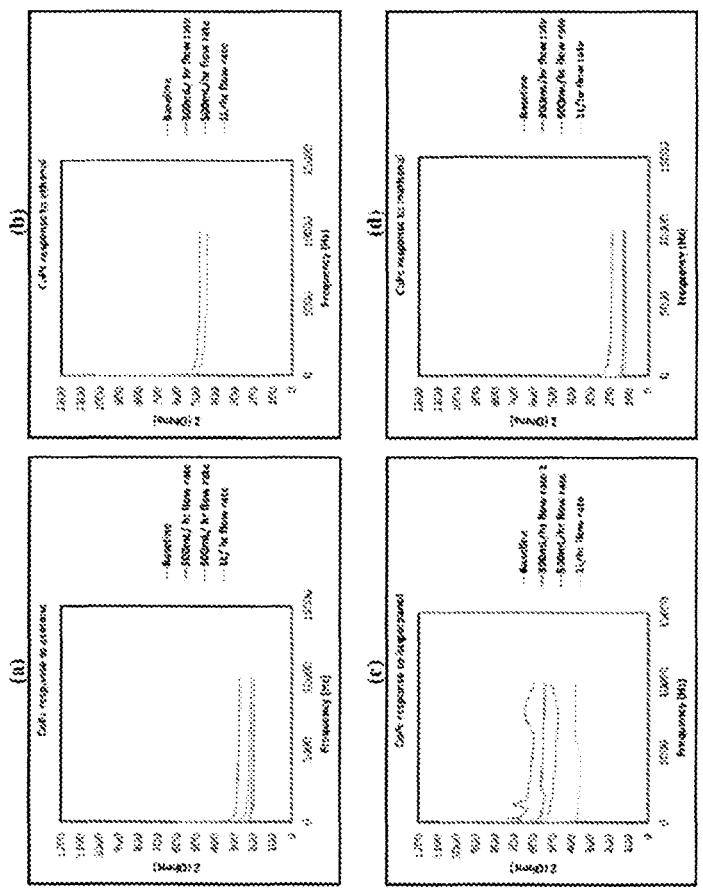

FIG. 24 shows CoPc response in terms of electrochemical impedance spectroscopy (Bode) to (a) acetone, (b) ethanol, (c) isopropanol, and (d) methanol. Electrochemical impedance spectroscopy (EIS) was performed in the frequency range from 0.1 Hz to 10 kHz, with an amplitude of 50 mV RMS. FIG. 24 describes the bode representation (only the magnitude of the impedance) of the CoPc response to the analytes. When exposed to methanol, even at lower frequencies (Hz), the CoPC resistance ($\Omega$) went down immediately, suggesting some capacitive behavior. Exposure to isopropanol led to a decrease of the resistance ($\Omega$) of the CoPc coated electrode by almost half. For ethanol, there might be some diffusion involved in the overall decrease of the resistance.

Table 3 shows the comprehensive data for all four MPcs' selectivity towards the analytes have been tabulated. The % change in resistance ($\Omega$) is calculated from the electrochemical impedance spectroscopy (Bode) data, before and after the exposure to the analyte, at 10 KHz. While conductivity is seen to be increased in every test, ZnPc, when exposed to acetone, resulted in opposite; resistance went up by 166%. Among the largest shifts in conductivity are: MgPc for isopropanol (89%) CoPc for ethanol (85%), and ZnPc for ethanol (68%).

The oxidation peaks have also been observed from the cyclic voltammetry tests (not reported here). There seems to be a general trend for the MPcs towards isopropanol, as anodic peaks for all the MPcs are observed at relatively at higher potentials (~0.9-1.3V), while for the rest of the analytes the peaks were generally seen at ~0.37-0.5V.

TABLE 3

Electrical responses in terms of % change in conductivity of CoPc, CuPc, MgPc, and ZnPc

| MPcs | Acetone (% change in $\Omega$) | Ethanol (% change in $\Omega$) | Isopropanol (% change in $\Omega$) | Methanol (% change in $\Omega$) |
|---|---|---|---|---|
| CoPc | 26.5% | 850% | 29.7% | 38.2% |
| CuPc | 28% | 17.34% | 12.15% | 14.9% |
| MgPc | 65% | 35% | 89% | 15% |
| ZnPc | −166% | 68% | 32.4% | 18.7% |

Figure 25:
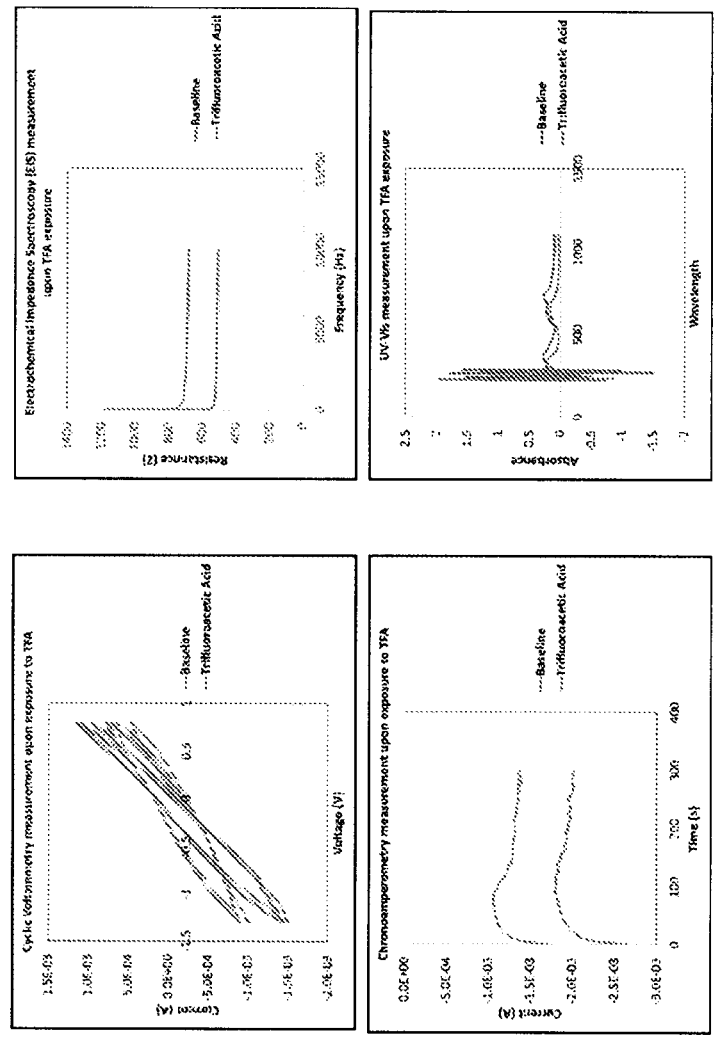

FIG. 25 shows test results involving detecting trifluoroacetic acid. Measurements of the sensing device upon exposure to TFA, from left to right: (a) Cyclic Voltammetry (CV), (b) Electrochemical Impedance Spectroscopy (EIS), (c) Chronoamperometry, and (d) UV-Vis.

While the invention has been described with reference to certain exemplary embodiments thereof, those skilled in the art may make various modifications to the described embodiments of the invention without departing from the scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

REFERENCES

1. Kauhanen, E., Harri, M., Nevalainen, A., and Nevalainen, T.: 'Validity of detection of microbial growth in buildings by trained dogs', Environment International, 2002, 28, (3), pp. 153-157
2. Wilson, A. D.: 'Advances in electronic-nose technologies for the detection of volatile biomarker metabolites in the human breath', Metabolites, 2015, 5, (1), pp. 140-163
3. Wilson, A. D., and Baietto, M.: 'Advances in electronic-nose technologies developed for biomedical applications', Sensors, 2011, 11, (1), pp. 1105-1176
4. Berna, A.: 'Metal oxide sensors for electronic noses and their application to food analysis', Sensors, 2010, 10, (4), pp. 3882-3910
5. Wilson, A. D., and Baietto, M.: 'Applications and advances in electronic-nose technologies', Sensors, 2009, 9, (7), pp. 5099-5148
6. Peris, M., and Escuder-Gilabert, L.: 'On-line monitoring of food fermentation processes using electronic noses and electronic tongues: a review', Analytica chimica acta, 2013, 804, pp. 29-36
7. Gobbi, E., Falasconi, M., Zambotti, G., Sberveglieri, V., Pulvirenti, A., and Sberveglieri, G.: 'Rapid diagnosis of Enterobacteriaceae in vegetable soups by a metal oxide sensor based electronic nose', Sensors and Actuators B: Chemical, 2015, 207, pp. 1104-1113
8. Sanaeifar, A., Mohtasebi, S. S., Ghasemi-Varnamkhasti, M., and Ahmadi, H.: 'Application of MOS based electronic nose for the prediction of banana quality properties', Measurement, 2016, 82, pp. 105-114
9. Fitzgerald, J. E., Bui, E. T., Simon, N. M., and Fenniri, H.: 'Artificial nose technology: status and prospects in diagnostics', Trends in biotechnology, 2017, 35, (1), pp. 33-42
10. Gliszczyńska-Świglo, A., and Chmielewski, J.: 'Electronic nose as a tool for monitoring the authenticity of food. A review', Food Analytical Methods, 2017, 10, (6), pp. 1800-1816
11. Lewis, J. M., Savage, R. S., Beeching, N. J., Beadsworth, M. B., Feasey, N., and Covington, J. A.: 'Identifying volatile metabolite signatures for the diagnosis of bacterial respiratory tract infection using electronic nose technology: A pilot study', PloS one, 2017, 12, (12), pp. e0188879
12. Sanaeifar, A., ZakiDizaji, H., Jafari, A., and de la Guardia, M.: 'Early detection of contamination and defect in foodstuffs by electronic nose: A review', Trends in Analytical Chemistry, 2017, 97, pp. 257-271
13. Wasilewski, T., Gębicki, J., and Kamysz, W.: 'Bioelectronic nose: Current status and perspectives', Biosensors and Bioelectronics, 2017, 87, pp. 480-494
14. Wojnowski, W., Majchrzak, T., Dymerski, T., Gębicki, J., and Namieśnik, J.: 'Electronic noses: Powerful tools in meat quality assessment', Meat science, 2017, 131, pp. 119-131
15. Shi, H., Zhang, M., and Adhikari, B.: 'Advances of electronic nose and its application in fresh foods: A review', Critical reviews in food science and nutrition, 2018, 58, (16), pp. 2700-2710
16. Son, M., and Park, T. H.: 'The bioelectronic nose and tongue using olfactory and taste receptors: Analytical tools for food quality and safety assessment', Biotechnology advances, 2018, 36, (2), pp. 371-379
17. Bonah, E., Huang, X., Aheto, J. H., and Osae, R.: 'Application of electronic nose as a non-invasive technique for odor fingerprinting and detection of bacterial 17. ... foodborne pathogens: a review', Journal of Food Science and Technology, 2019, pp. 1-14
18. Swanson, B., Fogg, L., Julion, W., and Arrieta, M. T.: 'Electronic Nose Analysis of Exhaled Breath Volatiles to Identify Lung Cancer Cases: A Systematic Review', Journal of the Association of Nurses in AIDS Care, 2020, 31, (1), pp. 71-79
19. Deng, Y.: 'Semiconducting Metal Oxides for Gas Sensing' (Springer, 2019. 2019)
20. Ram, M. K., and Bhethanabotla, V. R.: 'Sensors for chemical and biological applications' (CRC press, 2018. 2018)
21. Smith, T. D., and Bhatnagar, K. P.: 'Anatomy of the olfactory system': 'Handbook of clinical neurology' (Elsevier, 2019), pp. 17-28
22. Roper, S. D.: 'Gustatory and olfactory sensory transduction': 'Cell Physiology Source Book' (Elsevier, 2001), pp. 815-831
23. Wang, J., Luthey-Schulten, Z. A., and Suslick, K. S.: 'Is the olfactory receptor a metalloprotein?', Proceedings of the National Academy of Sciences, 2003, 100, (6), pp. 3035-3039
24. Khadka, R., Aydemir, N., Carraher, C., Hamiaux, C., Colbert, D., Cheema, J., Malmström, J., Kralicek, A., and Travas-Sejdic, J.: 'An ultrasensitive electrochemical impedance-based biosensor using insect odorant receptors to detect odorants', Biosensors and Bioelectronics, 2019, 126, pp. 207-213
25. Kotlowski, C., Larisika, M., Guerin, P. M., Kleber, C., Krober, T., Mastrogiacomo, R., Nowak, C., Pelosi, P., Schutz, S., and Schwaighofer, A.: 'Fine discrimination of volatile compounds by graphene-immobilized odorant-binding proteins', Sensors and Actuators B: Chemical, 2018, 256, pp. 564-572
26. Collins, R., and Mohammed, K.: 'Gas sensitivity of some metal phthalocyanines', Journal of Physics D: Applied Physics, 1988, 21, (1), pp. 154
27. Puttananjegowda, K., Takshi, A., and Thomas, S.: 'An Electrospun Nanofibrous Membrane based Electrochemical Glucose Sensor', IEEE Sensors Letters, 2020, 4, (2), pp. 1-4
28. Puttananjegowda, K., Takshi, A., and Thomas, S.: 'Perspective-Electrospun Nanofibrous Structures for Electrochemical Enzymatic Glucose Biosensing: A Perspective', Journal of The Electrochemical Society, 2020, 167, (3), pp. 037553
29. Takshi, A., Khorramshahi, F., Yaghoubi, H., Jun, D., and Beatty, J. T.: 'Ion-sensitive field-effect transistors with Si3N4 and TaO2 gate insulator for studying self-assembly of photosynthetic proteins', International Society for Optics and Photonics, 2019, pp. 110960-110967
30. Beygi, M., Bentley, J. T., Frewin, C. L., Kuliasha, C. A., Takshi, A., Bernardin, E. K., La Via, F., and Saddow, S. E.: 'Fabrication of a Monolithic Implantable Neural Interface from Cubic Silicon Carbide', Micromachines, 2019, 10, (7), pp. 430
31. Takshi, A., Yaghoubi, H., Wang, J., Jun, D., and Beatty, J. T.: 'Electrochemical field-effect transistor utilization to study the coupling success rate of photosynthetic protein complexes to cytochrome c', Biosensors, 2017, 7, (2), pp. 16
32. Chen, H., Qi, X., Ma, J., Zhang, C., Feng, H., and Yao, M.: 'Breath-borne VOC Biomarkers for COVID-19', medRxiv, 2020, pp. doi.org/10.1101/2020.1106.1121.20136523
33. Gao, X., and Zhang, T.: 'An overview: Facet-dependent metal oxide semiconductor gas sensors', Sensors and Actuators B: Chemical, 2018, 277, pp. 604-633
34. Rai, P., and Yu, Y.-T.: 'Citrate-assisted hydrothermal synthesis of single crystalline ZnO nanoparticles for gas sensor application', Sensors and Actuators B: Chemical, 2012, 173, pp. 58-65
35. Henis, Y., Gould, J. R., and Alexander, M.: 'Detection and identification of bacteria by gas chromatography', Applied microbiology, 1966, 14, (4), pp. 513-524
36. Korotcenkov, G., Han, S. D., and Stetter, J. R.: 'Review of electrochemical hydrogen sensors', Chemical reviews, 2009, 109, (3), pp. 1402-1433
37. Fergus, J. W.: 'A review of electrolyte and electrode materials for high temperature electrochemical CO2 and SO2 gas sensors', Sensors and Actuators B: Chemical, 2008, 134, (2), pp. 1034-1041
38. Purves, D., Augustine, G., Fitzpatrick, D., Katz, L., LaMantia, A., McNamara, J., and Williams, S.: 'The olfactory epithelium and olfactory receptor neurons', Neuroscience. 2nd Ed., 2001
39. Miller, T. C., Morgera, S. D., Saddow, S. E., Takshi, A., and Palm, M.: 'Electronic Nose with Detection Method for Alcohol, Acetone, and Carbon Monoxide in Coronavirus Disease 2019 Breath Simulation Model', IEEE Sensors Journal, 2021
40. Puttananjegowda, K., Takshi, A., and Thomas, S.: 'Silicon carbide nanoparticles electrospun nanofibrous enzymatic glucose sensor', Biosensors and Bioelectronics, 2021, 186, pp. 113285
41. Puttananjegowda, K., Takshi, A., and Thomas, S.: 'Silicon Carbide Nanoparticles based Nanofibrous Membrane in Comparison with Thin-Film Enzymatic Glucose Sensor', IEEE Transactions on NanoBioscience, 2021, pp. DOI: 10.1109/TNB.2021.3100466
42. Azim-Araghi, M., and Krier, A.: 'The influence of ammonia, chlorine and nitrogen dioxide on chloro-aluminium phthalocyanine thin films', Applied surface science, 1997, 119, (3-4), pp. 260-266
43. Spadavecchia, J., Ciccarella, G., and Rella, R.: 'Optical characterization and analysis of the gas/surface adsorption phenomena on phthalocyanines thin films for gas sensing application', Sensors and Actuators B: chemical, 2005, 106, (1), pp. 212-220
44. https://sor.epa.gov/sor_internet/registry/substreg/search-andretrieve/advancedsearch/search.do?details=display-Details&selectedSubstanceId=83723
45. Fenske, J. D., and Paulson, S. E.: 'Human breath emissions of VOCs', Journal of the Air & Waste Management Association, 1999, 49, (5), pp. 594-598
46. Ruszkiewicz, D. M., Sanders, D., O'Brien, R., Hempel, F., Reed, M. J., Riepe, A. C., Bailie, K., Brodrick, E., Darnley, K., and Ellerkmann, R.: 'Diagnosis of COVID-19 by analysis of breath with gas chromatography—ion mobility spectrometry—a feasibility study', EClinicalMedicine, 2020, 29, pp. 100609
47. Abdelkhalek, M., Alfayad, S., Benouezdou, F., Fayek, M. B., and Chassagne, L.: 'Compact and embedded electronic nose for volatile and non-volatile odor classification for robot applications', IEEE Access, 2019, 7, pp. 98267-98276
48. Saito, M., Uchida, N., Furutani, S., Murahashi, M., Espulgar, W., Nagatani, N., Nagai, H., Inoue, Y., Ikeuchi, T., and Kondo, S.: 'Field-deployable rapid multiple biosensing system for detection of chemical and biological warfare agents', Microsystems & Nanoengineering, 2018, 4, (1), pp. 1-11

49. Bansil, R., and Turner, B. S.: 'The biology of mucus: Composition, synthesis and organization', Advanced drug delivery reviews, 2018, 124, pp. 3-15
50. Duan, X., Block, E., Li, Z., Connelly, T., Zhang, J., Huang, Z., Su, X., Pan, Y., Wu, L., and Chi, Q.: 'Crucial role of copper in detection of metal-coordinating odorants', Proceedings of the National Academy of Sciences, 2012, 109, (9), pp. 3492-3497
51. Ding, H., Erokhin, V., Ram, M. K., Paddeu, S., Valkova, L., and Nicolini, C.: 'A physical insight into the gas-sensing properties of copper (II) tetra-(tert-butyl)-5, 10, 15, 20-tetraazaporphyrin Langmuir-Blodgett films', Thin Solid Films, 2000, 379, (1-2), pp. 279-286
52. Borchert, N. B., Kerry, J. P., and Papkovsky, D. B.: 'A $CO_2$ sensor based on Pt-porphyrin dye and FRET scheme for food packaging applications', Sensors and Actuators B: Chemical, 2013, 176, pp. 157-165
53. Ceyhan, T., Altindal, A., Erbil, M. K., and Bekaroğlu, Ö.: 'Synthesis, characterization, conduction and gas sensing properties of novel multinuclear metallo phthalocyanines (Zn, Co) with alkylthio substituents', Polyhedron, 2006, 25, (3), pp. 737-746
54. Bariain, C., Matias, I., Fernandez-Valdivielso, C., Arregui, F., Rodriguez-Mendez, M., and De Saja, J.: 'Optical fiber sensor based on lutetium bisphthalocyanine for the detection of gases using standard telecommunication wavelengths', Sensors and Actuators B: Chemical, 2003, 93, (1-3), pp. 153-158
55. Nardis, S., Monti, D., Di Natale, C., D'Amico, A., Siciliano, P., Forleo, A., Epifani, M., Taurino, A., Rella, R., and Paolesse, R.: 'Preparation and characterization of cobalt porphyrin modified tin dioxide films for sensor applications', Sensors and Actuators B: Chemical, 2004, 103, (1-2), pp. 339-343
56. Cochran, J. C.: 'Lewis Acid/Base Reaction Chemistry (Leach, Mark R.)', in Editor (Ed.)^(Eds.): 'Book Lewis Acid/Base Reaction Chemistry (Leach, Mark R.)' (ACS Publications, 2001, edn.), pp.
57. Ghani, F., Kristen, J., and Riegler, H.: 'Solubility properties of unsubstituted metal phthalocyanines in different types of solvents', Journal of Chemical & Engineering Data, 2012, 57, (2), pp. 439-449
58. Ghazal, B., Azizi, K., Ewies, E. F., Youssef, A. S., Mwalukuku, V. M., Demadrille, R., Tones, T., and Makhseed, S.: 'Push-Pull Zinc Phthalocyanine Bearing Hexa-Tertiary Substituted Carbazolyl Donor Groups for Dye-Sensitized Solar Cells', Molecules, 2020, 25, (7), pp. 1692
59. Lu, J., Liu, S., and Wang, M.: 'Push-pull zinc porphyrins as light-harvesters for efficient dye-sensitized solar cells', Frontiers in chemistry, 2018, 6, pp. 541
60. Kivi-Etelätalo, E., Kostiainen, O., and Kokko, M.: 'Analysis of volatile organic compounds in air using retention indices together with a simple thermal desorption and cold trap method', Journal of Chromatography A, 1997, 787, (1-2), pp. 205-214
61. Khorramshahi, F., Woughter, A. G., Ram, M. K., Kymissis, I., and Takshi, A.: 'Apparent Piezo-Photocurrent Modulation in Methylammonium Lead Iodide Perovskite Photodetectors', Advanced Electronic Materials, 2019, 5, (12), pp. 1900518
62. Khorramshahi, F., and Takshi, A.: 'Novel fabrication of flexible perovskite photosensor using capillary motion', in Editor (Ed.)^(Eds.): 'Book Novel fabrication of flexible perovskite photosensor using capillary motion' (International Society for Optics and Photonics, 2018, edn.), pp. 107380R
63. Khorramshahi, F., Aljafari, B., Kymissis, I., and Takshi, A.: 'Laser assisted rapid fabrication of perovskite photodetector', International Society for Optics and Photonics, 2019, pp. 110960-C
64. Takshi, A., Yaghoubi, H., Tevi, T., and Bakhshi, S.: 'Photoactive Supercapacitors for Solar Energy Harvesting and Storage', Journal of Power Sources, 2015, 275, pp. 621-626
65. Takshi, A., Madden, J. D., and Beatty, J. T.: 'Diffusion model for charge transfer from a photosynthetic reaction center to an electrode in a photovoltaic device', Electrochimica Acta, 2009, 54, (14), pp. 3806-3811
66. Takshi, A., Yaghoubi, H., Mahmoudzadeh, A., Saer, R., Madden, J. D., and Beatty, J. T.: 'Application of Wide Band Gap Semiconductors to Increase Photocurrent in a Protein Based Photovoltaic Device', MRS Proceedings, Fall meeting, 2011, 1414, pp. mrsf11-1414-hh1407-1401
67. Yaghoubi, H., Takshi, A., Mahmoudzadeh, A., Saer, R., Madden, J. D., and Beatty, J. T.: 'Free-floating reaction centers (RCs) versus attached monolayer of RCs in bio-photovoltaic devices', MRS Proceedings, Fall Meeting, 2011, 1414, pp. mrsf11-1414-hh1407-1403
68. Yaghoubi, H., Li, Z., Jun, D., Saer, R., Slota, J. E., Beerbom, M., Schlaf, R., Madden, J. D., Beatty, J. T., and Takshi, A.: 'The Role of Gold-Adsorbed Photosynthetic Reaction Centers and Redox Mediators in the Charge Transfer and Photocurrent Generation in a Bio-Photoelectrochemical Cell', The Journal of Physical Chemistry C, 2012, 116, (47), pp. 24868-24877
69. A Mahmoudzadeh, R Saer, D Jun, S M Mirvakili, A Takshi, B Iranpour, E Ouellet, E T Lagally, J D W Madden, and Beatty, J. T.: 'Photocurrent generation by direct electron transfer using photosynthetic reaction centres', Smart Materials and Structures, 2011, 20, (9), pp. 094019
70. Tevi, T., Yaghoubi, H., Wang, J., and Takshi, A.: 'Application of poly (p-phenylene oxide) as blocking layer to reduce self-discharge in supercapacitors', Journal of Power Sources, 2013, 241, pp. 589-596
71. Tevi, T., and Takshi, A.: 'Modeling and simulation study of the self-discharge in supercapacitors in presence of a blocking layer', Journal of Power Sources, 2015, 273, pp. 857-862
72. Tevi, T., Birch, S. W. S., Thomas, S. W., and Takshi, A.: 'Effect of Triton X-100 on the Double Layer Capacitance and Conductivity of Poly(3,4-ethylenedioxythiophene): Poly (styrenesulfonate) (PEDOT: PSS) Films', Synthetic Metals, 2014, 191, pp. 59-65
73. Takshi, A., Dimopoulos, A., and Madden, J. D.: 'Depletion width measurement in an organic Schottky contact using a metal-semiconductor field-effect transistor', Applied Physics Letters, 2007, 91, (8), pp. 083513
74. Takshi, A.: 'Organic Metal-Semiconductor Field-Effect Transistors (OMESFETs)', Electrical and Computer Engineering, University of British Columbia (UBC), PhD dissertation, 2007
75. Ram, M. K., Goswami, D. Y., Takshi, A., and Stefanakos, E.: 'A new chromic (TouchChromic) thin film', Acta Materialia, 2016, 121, pp. 325-330
76. Takshi, A., Dimopoulos, A., and Madden, J. D.: 'Simulation of a Low-Voltage Organic Transistor Compatible With Printing Methods', IEEE Transactions on Electron Devices, 2008, 55, (1), pp. 276-282
77. Takshi, A., Dimopoulos, A., and Madden, J. D.: 'Simulation of a dual gate organic transistor compatible with printing methods', Solid-State Electronics, 2008, 52, (1), pp. 107-114

78. Takshi, A., and Madden, J.: 'Study the effect of distribution of density of states on the subthreshold characteristics of an organic field-effect transistor (OFET)', J Comput Electron, 2011, 10, (1-2), pp. 154-162
79. Takshi, A., Mohammadi, M., and Madden, J. D.: 'Study the effect of distribution of density of states on the depletion width of organic Schottky contacts', Solid-State Electronics, 2008, 52, (11), pp. 1717-1721
80. Takshi, A., Bebeau, J., and Rahimi, F.: 'Perovskite based photosensor for electrochemical studies', International Society for Optics and Photonics (SPIE), 2016, pp. 99440R
81. Rosa-Ortiz, S. M., Phan, K.-K., Khattak, N., Thomas, S. W., and Takshi, A.: 'Hydrogen Evolution Assisted Cyclic Electroplating for Lateral Copper Growth in Wearable Electronics', Journal of Electroanalytical Chemistry, 2021, pp. 115796
82. Rosa-Ortiz, S. M., Takshi, A., and Thomas, S.: 'Advances in lateral copper electroplated metallic tracks—production and applications by using hydrogen evolution-assisted electroplating', MRS Advances, 2021, 6, (26), pp. 654-658

What is claimed is:

1. A sensor comprising:
a first electrode;
a second electrode;
a liquid electrolyte comprising a predetermined amount of at least one of a natural mucus and a synthetic mucus; and
a separator comprising a porous member configured to hold the liquid electrolyte and wet the surface of the first electrode and the surface of the second electrode with the liquid electrolyte.

2. The sensor of claim 1, wherein the first electrode comprises a metallophthalocyanine or a metalloporphyrin or a derivative thereof or the first electrode is in electrical contact with a metallophthalocyanine or a metalloporphyrin or a derivative thereof, wherein the metal in the metallophthalocyanine or metalloporphyrin or derivative is selected from the group consisting of Cu, Zn, Co, Mg, Mn, Fe, Pt, and Pd.

3. The sensor of claim 1, wherein the second electrode comprises an ideally polarized electrode made from non-redox active materials.

4. The sensor of claim 3, wherein the second electrode is a platinum or carbon electrode.

5. The sensor of claim 1, further comprising an electrolyte storage container and a dropper, a nozzle, an inkjet nozzle, or microfluid delivery component to provide the liquid electrolyte to the porous member.

6. The sensor of claim 5, further comprising an inkjet nozzle to provide the liquid electrolyte.

7. The sensor of claim 1, further comprising a reference electrode.

8. The sensor of claim 7, wherein the first electrode and the reference electrode are arranged on one side of the separator and the second electrode is arranged on the opposite side of the separator.

9. The sensor of claim 1, further comprising one or more additional first electrodes.

10. The sensor of claim 9, wherein first electrodes are arranged on one side of the separator and the second electrode is arranged on the opposite side of the separator.

11. The sensor of claim 1, further comprising a light source.

12. The sensor of claim 1, further comprising a computer processor and a meter in electrical communication with the first sensor and the second sensor, the meter being configured to measure electrical resistance across the first sensor and the second sensor.

13. The sensor of claim 1, wherein the first electrode, second electrode, and separator are arranged in a stacked layer configuration with the separator between the first electrode and the second electrode.

14. The sensor of claim 1, wherein the first electrode, second electrode, and separator are arranged with the first electrode and the second electrode being printed on opposite sides of the separator.

15. The sensor of claim 1, further comprising a passage configured to direct a gas to be tested across the surface of the first electrode.

16. The sensor of claim 1, wherein the sensor is configured to detect a measurement of an electrochemical reaction occurring at the first electrode.

17. The sensor of claim 1, wherein the sensor is configured to detect a measurement of an electrochemical change occurring at the first electrode.

18. The sensor of claim 16, wherein the sensor is configured to perform one or more detection measurements based on one or more detection forms selected from the group consisting of cyclic voltammetry, chronoamperometry, and electrochemical impedance spectroscopy.

19. The sensor of claim 1, further comprising a heating or a cooling stage and a temperature sensor operably connected to the heating or the cooling stage to allow the heating or the cooling stage to maintain a predetermined temperature.

20. A method for detecting a chemical property of a gas, the method comprising the steps of:
directing molecules of the gas to a sensor according to claim 1 to facilitate capture of some of the molecules of the gas by the electrolyte and interaction by some of the molecules of the gas with the first electrode and
measuring an electrochemical change at the first electrode.

* * * * *